INVENTORS
Noriyoshi Kuroyanagi
Yoshihisa Matsuura

BY
Watson, Cole, Grindle & Watson
ATTORNEYS

INVENTORS
Noriyoshi Kuroyanagi
Yoshihisa Matsuura

BY Watson, Cole, Grindle + Watson

ATTORNEYS

Nov. 25, 1969 NORIYOSHI KUROYANAGI ET AL 3,480,734

SPEED CONVERSION SYSTEMS FOR PULSE SIGNALS IN A PCM SYSTEM

Filed Oct. 10, 1966 14 Sheets-Sheet 3

INVENTORS

Noriyoshi Kuroyanagi

Yoshihisa Matsuura

BY Watson, Cole, Grindle + Watson

ATTORNEYS

INVENTORS
Noriyoshi Kuroyanagi
Yoshihisa Matsuura

BY Watson, Cole, Grindle + Watson
ATTORNEYS

INVENTORS
Noriyoshi Kuroyanagi
Yoshihisa Matsumura
BY
Watson, Cole, Grindle + Watson
ATTORNEYS

SPEED CONVERSION SYSTEMS FOR PULSE SIGNALS IN A PCM SYSTEM

INVENTORS
Noriyoshi Kuroyanagi
Yoshihisa Matsumura

BY Watson, Cole, Grindle + Watson
ATTORNEYS

Nov. 25, 1969 NORIYOSHI KUROYANAGI ET AL 3,480,734

SPEED CONVERSION SYSTEMS FOR PULSE SIGNALS IN A PCM SYSTEM

Filed Oct. 10, 1966 14 Sheets-Sheet 7

INVENTORS

Noriyoshi Kuroyanagi

Yoshihisa Matsuura

BY Watson, Cole, Grindle & Watson

ATTORNEYS

Nov. 25, 1969 NORIYOSHI KUROYANAGI ET AL 3,480,734

SPEED CONVERSION SYSTEMS FOR PULSE SIGNALS IN A PCM SYSTEM

Filed Oct. 10, 1966 14 Sheets-Sheet 8

INVENTORS
Noriyoshi Kuroyanagi
Yoshihisa Matsuura

BY Watson, Cole, Grindle + Watson

ATTORNEYS

INVENTORS
Noriyoshi Kuroyanagi
Yoshihisa Matsuura

BY Watson, Cole, Grindle & Watson
ATTORNEYS

Nov. 25, 1969 NORIYOSHI KUROYANAGI ET AL 3,480,734

SPEED CONVERSION SYSTEMS FOR PULSE SIGNALS IN A PCM SYSTEM

Filed Oct. 10, 1966 14 Sheets-Sheet 10

INVENTORS
Noriyoshi Kuroyanagi
Yoshihisa Matsumura

BY Watson, Cole, Grindle + Watson
ATTORNEYS

INVENTORS
Noriyoshi Kuroyanagi
Yoshihisa Matsuura

BY Watson, Cole, Grindle + Watson
ATTORNEYS

Nov. 25, 1969 NORIYOSHI KUROYANAGI ET AL 3,480,734

SPEED CONVERSION SYSTEMS FOR PULSE SIGNALS IN A PCM SYSTEM

Filed Oct. 10, 1966

14 Sheets-Sheet 12

INVENTORS
Noriyoshi Kuroyanagi
Yoshihisa Matsuura

BY Watson, Cole, Grindle + Watson
ATTORNEYS

INVENTORS
Noriyoshi Kuroyanagi
Yoshihisa Matsuura

BY Watson, Cole, Grindle + Watson
ATTORNEYS

INVENTORS
Noriyoshi Kuroyanagi
Yoshihisa Matsuura

BY Watson, Cole, Grindle & Watson
ATTORNEYS

3,480,734
SPEED CONVERSION SYSTEMS FOR PULSE SIGNALS IN A PCM SYSTEM

Noriyoshi Kuroyanagi and Yoshihisa Matsuura, Tokyo, Japan, assignors to Nippon Telegraph and Telephone Public Corporation, Tokyo, Japan Filed Oct. 10, 1966, Ser. No. 585,584
Claims priority, application Japan, Oct. 15, 1965, 40/62,975; Nov. 16, 1965, 40/69,974
Int. Cl. H04j 3/06
U.S. Cl. 179—15 1 Claim

ABSTRACT OF THE DISCLOSURE

Pulse speed conversion of a plurality of low speed signals in a PCM transmission system is accomplished by forming groups of high speed pulses from the low speed signals in a delay register and reading out a single pulse group having a predetermined phase. The input PCM signals are sampled by sampling pulses, which are synchronous with the converted PCM signals, and which are controlled in response to a selected phase difference between the converted signals and the input PCM signals. Pulses are inserted in the pulse groups to compensate for the phase difference when the phase difference exceeds a predetermined amount. The receiving equipment includes means for recovering the input PCM signals by subtracting the inserted pulses and converting the high speed pulses to the low speed pulses corresponding to the PCM input signals.

This invention relates to speed conversion systems for pulse signals with asynchronous speeds in multiple PCM communication systems.

Generally, in order to apply a broadband PCM system to a main route for which is used a coaxial cable or the like, it is necessary to multiplex *n* systems of low speed PCM signals into a high speed PCM signal and transmit it on a high speed line. It is also required to signal so as to reform the low-speed PCM signals.

In such case, it is possible to rather simply realize a multiplexing circuit wherein the *n* integral times of the bit cycle time of the high speed PCM signals are in such synchronous relation as to be just equal to the bit cycle time of the low speed PCM signals. In such a case, only a speed converting function will be required and it will not be necessary to specifically provide an independent synchronization.

For this purpose, a system synchronization technique has been developed, which is known as pulse insertion synchronization (U.S. Patent 3,136,861) and has such features that *m* additional pulses (insertion pulses) are inserted into an original low speed pulse stream at a sending terminal. The pulses are inserted at every time when the phase difference between the low speed clock rate and a sub-high speed clock rate, which is just 1 *n*th of the high speed clock rate, attains *m* times twice the radian frequency of the low speed clock rate. Thereafter at a receiving terminal, these additional pulses must be removed to recover the original low speed clock rate by use of a phase controlled oscillator (PCO).

In this application, the arrangement of PCM signals on the high speed line shall be considered. There are (*a*) a bit arrangement system wherein information contained in low speed PCM signals of different systems are arranged for each bit and (*b*) a channel arrangement system wherein information in low speed PCM signals of different systems are arranged for each channel signal.

Now, between sub-high and low speed clock rates in an asynchronous relation with each other, there is a slight difference in the speed of the corresponding time slot. Due to this difference, the speed adjustment between them is realized by inserting pulses into each low speed PCM signal at substantially regular time intervals to alter the time slots. In such a case, there are considered two kinds of systems, namely, (*c*) a system wherein the bits of the inserted pulses are one bit that is called a one bit insertion system (U.S. Patent No. 3,136,861) and (*d*) a system known as a one channel insertion system. The classification of (*c*) and (*d*) is different from the classification of (*a*) and (*b*). Consequently, there are four classes of systems, namely, *a–c*, *a–d*, *b–c* and *b–d*; systems *b–d* and *a–c* being described herein.

If an elastic memory circuit is used to perform the pulse insertion synchronization defined as in (*b*) and (*d*) above, memory elements of 2 to 3 words (one word is the amount of information in one channel and is generally 8 to 9 bits) and many logical gates will be required and the circuit will become very complicated. Also, in order to perform the pulse insertion defined above in (*a*) and (*c*), memory elements of several bits and many associated logical gates will be required and the circuit will also become very complicated.

The present invention overcomes such defects and is embodied in a circuit using only a few memory elements and logical gates. That is to say, this invention comprises a circuit for generating a plurality of pulse groups which are arranged at a high speed bit cycle time and transmit the same information by applying an input PCM signal into a delay line register, gate reading circuits for obtaining read-out signals by reading-out only the pulse train in any desired phase among the plurality of pulse trains and a sampling gate circuit, for sampling the input PCM signal or the read-out signal with sampling pulses, which is controlled in response to the phase difference between the sub-high and low speed PCM clock rate, and is synchronized with the output PCM signal, whereby the phase difference between the sub-high and low speed PCM signals is compensated by inserting or separating pulses.

A principal object of the present invention is to provide a very simple circuit arrangement (delay line register) to perform a speed converting function for converting high speed PCM signals to low speed PCM signals or vice versa.

Another object of the present invention is to provide a simple circuit arrangement (delay line register) to perform the above described speed converting function for PCM signals of a bit arrangement system or word arrangement system or an independent synchronizing function in which are used insertion pulses by a bit insertion system or word insertion system.

Specific embodiments of the invention will now be described by way of example, with reference to the accompanying drawings, in which:

FIGURES 1*a* and 1*b* are supplementary explanatory diagrams of the present invention;

FIGURES 2*a* and 2*b* are sending circuit diagrams of an embodiment of the system *b–d* of the present invention;

FIGURES 3*a* and 3*b* are timing diagrams for the circuit shown in FIG. 2;

FIG. 4 is a sending circuit diagram of another embodiment of the system *a–c* of the present invention;

FIGURES 5*a* and 5*b* are supplementary explanatory diagrams of the system shown in FIG. 4;

Figure 10:
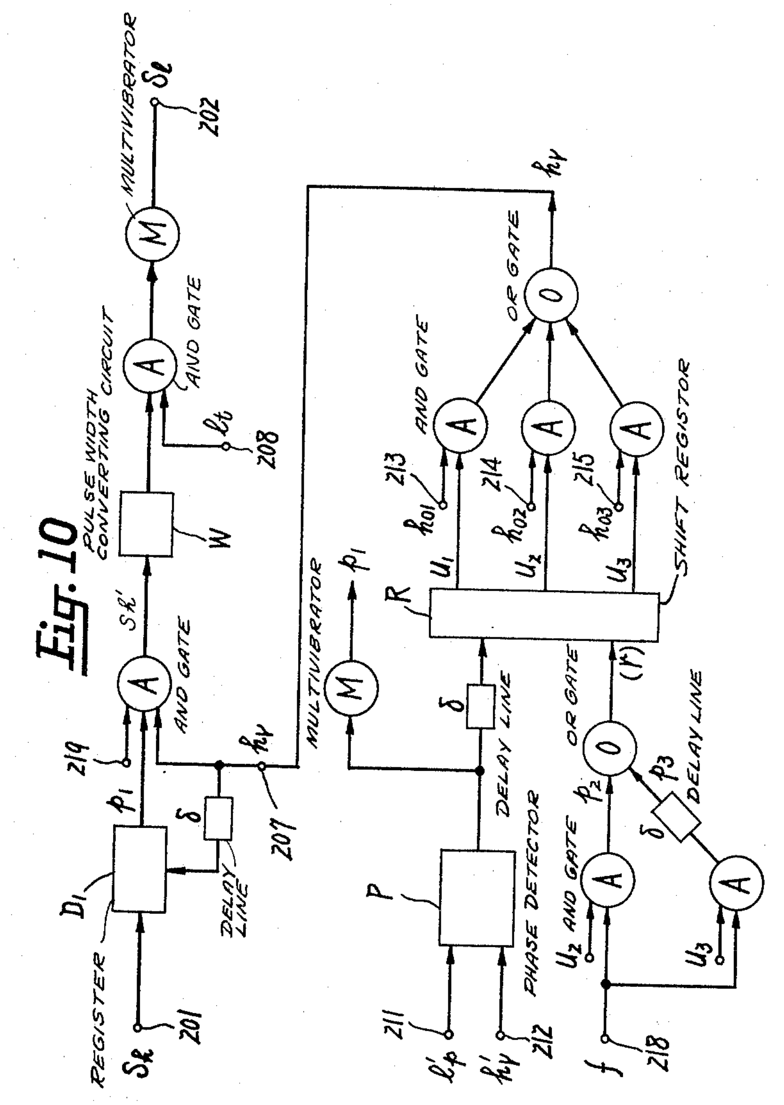
FIG. 10 is a receiving circuit diagram of another embodiment of the system *a–c* of the present invention.
Figure 11A:
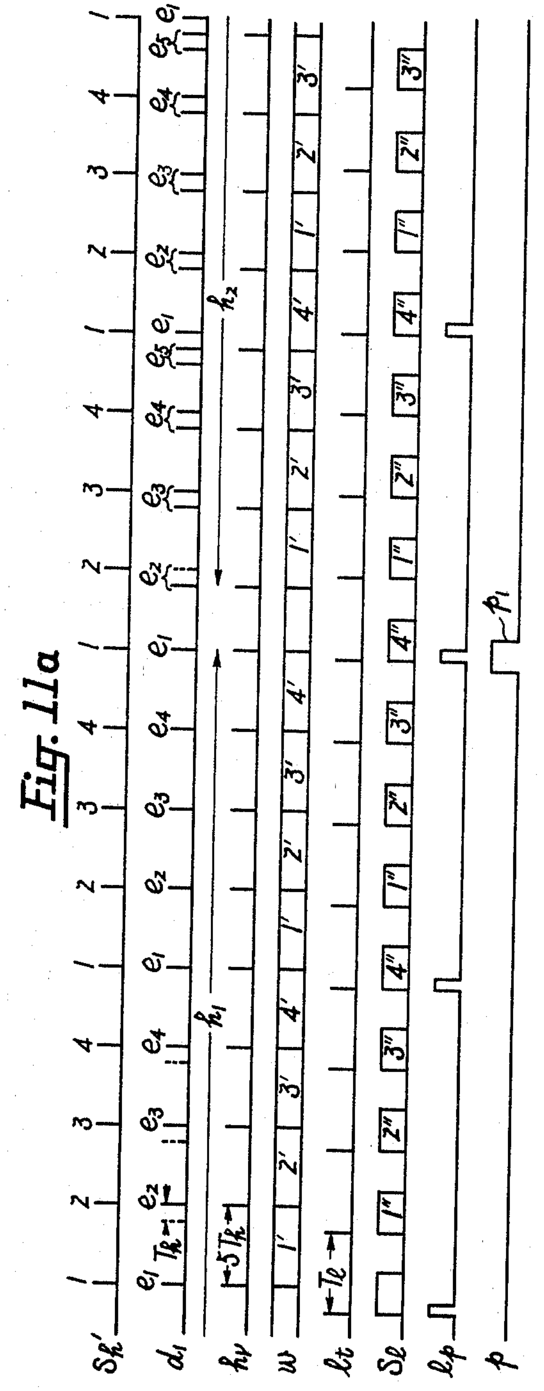
Figure 12:
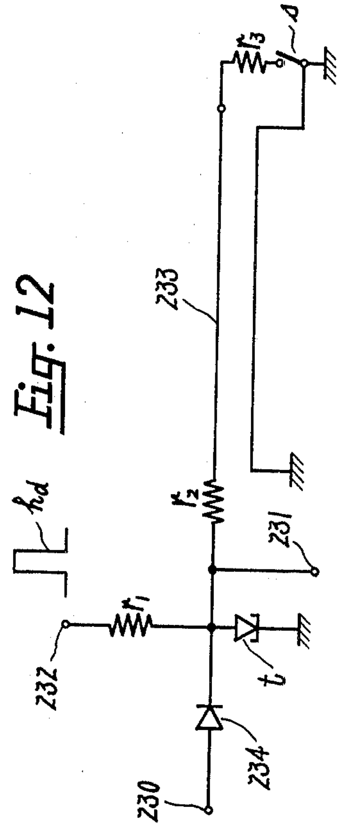
Figure 11B:
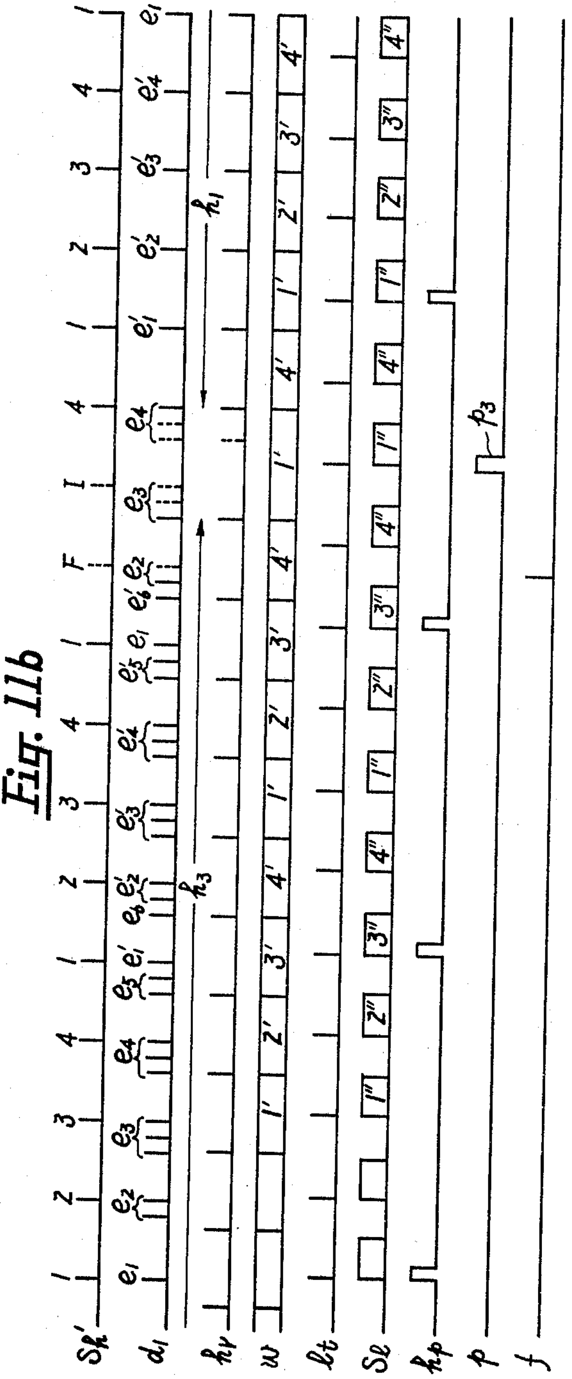

FIGURES 11*a* and 11*b* are supplementary explanatory diagrams of FIG. 10;

FIG. 12 is a diagram showing a delay line register; and

Figure 13:
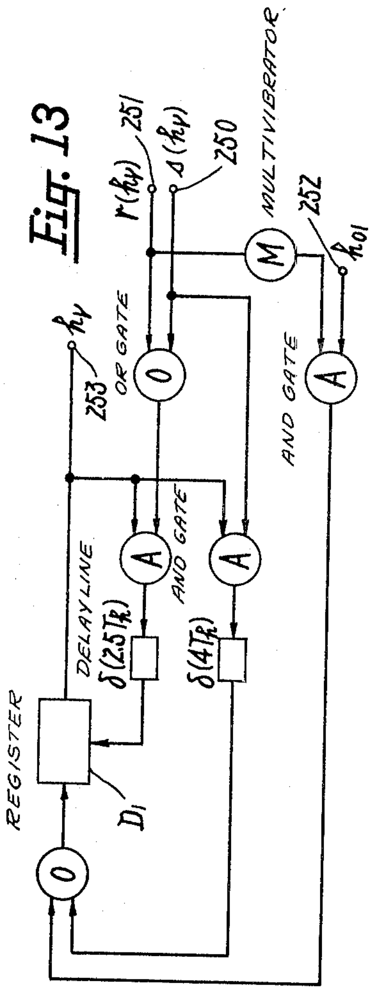

FIG. 13 is a diagram showing an embodiment of a peripheral circuit.

Figure 1A:
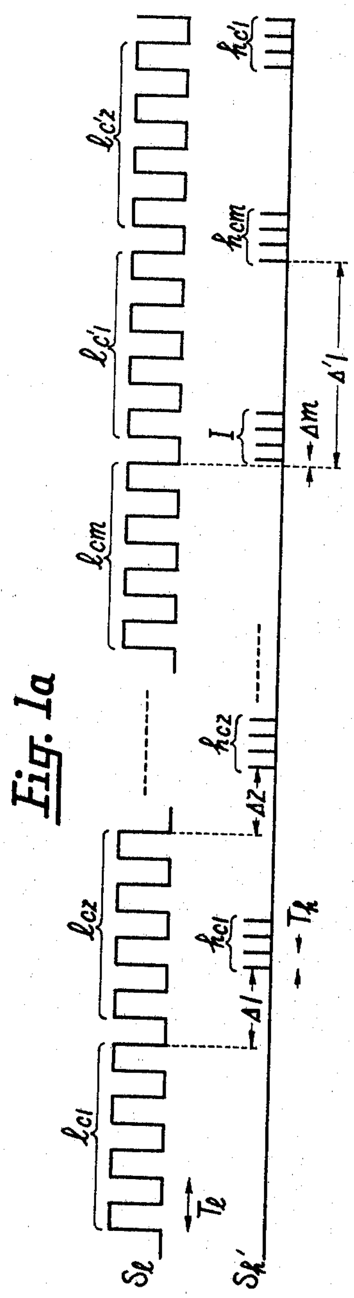
Figure 1B:
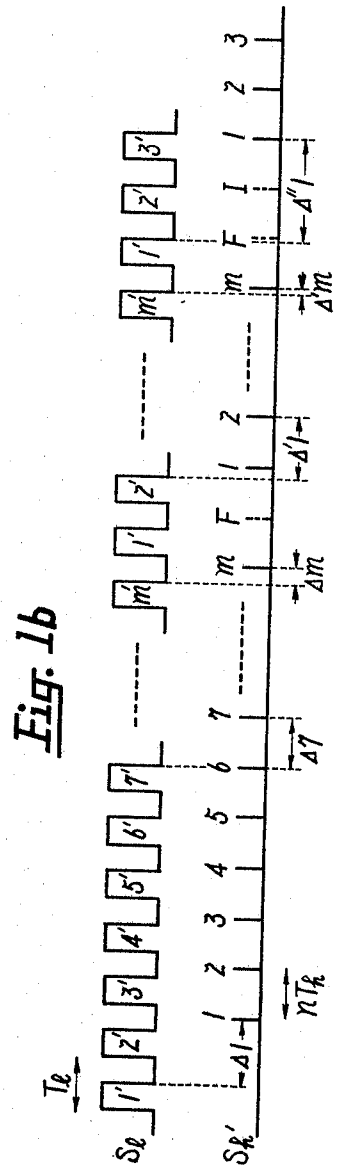

FIGURES 1*a* and 1*b* are supplementary explanatory diagrams of the present invention for explaining the various initially described multiplexing systems. FIG. 1*a* is an explanatory diagram of a system (*b–d*) (channel arrangement one-channel insertion system). $S_l$ are time slots of low speed PCM signals of one system. $S_h'$ is a sub-high speed bit signal to transmit information corresponding to the low speed signal $S_l$. The high speed bit signal $S_h$ (illustrated in FIGS. 8 and 10) can be composed of *n* units of sub-high speed bit signal $S_h'$. *n* denotes the number of low speed systems to be multiplexed.

The clock rate of $S_h'$ is the same as that of $S_h$, but $S_h'$ is not synchronized with $S_l$. Consequently, the conversion $S_l$–$S_h'$ requires an important converting function, but the multiplexing $S_h'$–$S_h$, and demultiplexing $S_h$–$S_h'$ can be realized easily with the aid of OR or AND gates. $l_{c1}$, $l_{c2}$ . . . $l_{cm}$ and $l'_{c1}$, $l'_{c2}$ . . . are time slots of low speed channel signals. $h_{c1}$, $h_{c2}$ . . . $h_{cm}$, $h'_{c1}$ and $h'_{c2}$ are time slots of the high speed channel signals transmitting information corresponding to the suffixes and primes (′) of the above mentioned low speed channel signals as shown in FIG. 1*a* (The words "time slots" shall be omitted in the following explanation.) $T_h$ and $T_l$ are cycle times at the bit rates of high and low speed PCM signals, respectively. $\Delta 1$, $\Delta 2$ . . . $\Delta m$ and $\Delta' 1$ are phase differences between the high and low speed signals. For example, $\Delta 1$ represents a phase difference between the falling edge of $l_{c1}$ and the leading edge of $h_{c1}$. When $S_l$ is converted correspondingly to $S_h$ as in the diagram, in order that there may be no information loss in the converting process, a relation of $$\Delta 1 > \Delta 2 > \Delta 3 \ldots > \Delta m \quad (1)$$

will be required. (The relation of $\Delta 1 = \Delta 2 = \Delta 3 \ldots$ cannot exist, because $S_l$ and $S_h$ are assumed to be in an asynchronous relation.) Here the number of bits of one channel is assumed to be 4. In order to multiplex the same *n* system as $S_l$ into the high speed PCM signals $S_h$, to satisfy Formula 1, the following relation is required:

$$nT_h < T_R \quad (2)$$

$\Delta 1$ is an initial phase difference which will become $\Delta 2$, $\Delta 3$ . . . and will reduce in value from the Formula 1 with the lapse of time.

If the phase difference $\Delta m$ for the *m*th channel has become smaller than a threshold phase difference $\Delta o$ set in advance, then one channel of a special pattern (of additional bits) I will be inserted. Thus, the next phase difference will become $\Delta' 1$ as illustrated and will be large enough. Then, after *m′* channels (*m′* is not always equal to *m*), $\Delta' m$ will again become smaller than $\Delta o$ and the special pattern I will be inserted. Thus, while the decreasing phase difference is restored by the inserted time slot I, the speed conversion function is performed.

FIG. 1*b* is an explanatory diagram of a system (*a–c*) (a bit arrangement one-bit insertion system). Here, no distinction of channels is required. Serial numbers $S_l$ (1′, 2′, 3′ . . . ) are attached to the respective low speed bit signals. 1, 2, 3 . . . are sub-high speed bit signals to transmit information corresponding to the bit signals 1′, 2′, 3′ . . . , respectively. The clock rate of $S_h'$ is slightly higher than that of $S_l$ and one/*n*th times the high speed clock rate which can transmit a high speed signal of multiplexed *n* systems of the same sub-high speed signals as $S_h'$. Since the cycle time of the high speed clock rate is $T_h$, the cycle time of the sub-high speed clock rate must be $nT_h$. $nT_h$ is slightly longer than $T_l$ which is the cycle time of the low speed clock rate.

In the diagram, between the adjacent time slots occupied by $S_h'$, (*n–l*) time slots of the other multiplexing sub-high speed bit signals should be allotted, in order to multiplex *n* sub-high speed systems like $S_h'$ into the high speed bit signals $S_h$.

The multiplexing function (*n* systems of $S_h' \to S_h$) is simple, because $S_h'$ and $S_h$ are in synchronous relationship.

Then, the speed conversion ($S_l$–$S_l'$) becomes very important here. The initial phase $\Delta 1$ will reduce with the lapse of time. After the lapse of *m* bits, the phase difference will become $\Delta m$.

Framing pulses F are inserted into $S_h'$ at regular intervals of the pulse stream $S_h'$, for example, at every *m* time slots ($mnT_h$). The *m*th phase difference $\Delta m$, $\Delta m'$, which is measured at each previous time slot of F, determines whether or not the insertion of the additional pulses I will be accomplished. If $\Delta$ is defined as a threshold phase difference, then, according to the diagram, only framing pulse F is inserted for the condition $\Delta m > \Delta$. In this case, the next phase difference is $\Delta' 1 = \Delta m + nT_h$. If the insertion of the frame pulse is only repeated at every frame position, the previous phase difference must tend to decrease because of the relationship expressed in Formula 2. Both the framing pulse F and the inserted pulse I are inserted for the condition, $\Delta' m < \Delta$, and the next phase difference is, $\Delta'' = m + 2nT_h$. Since $\Delta''$ is longer than $\Delta'$, the *n*th phase difference $\Delta'' m$ must be longer than $\Delta$. However, after several framing cycle times (not constant), the *m*th phase difference will decrease and be shorter than $\Delta$. In such a case, the same pulse as above will be inserted. While this process is repeated, the speed conversion between $S_l$ and $S_h'$ is performed and the information on the low speed pulse train is transferred to the sub-high speed pulse train.

First of all, for the case of multiplexing low speed PCM signals on high speed PCM signals, specific embodiments for realizing the above described respective synchronizing systems shall be explained. Further, a channel arrangement 2-bit insertion system can be considered but a type intermediate between the above mentioned two can be realized by using the same technique and therefore shall not be explained here.

Figure 2A:
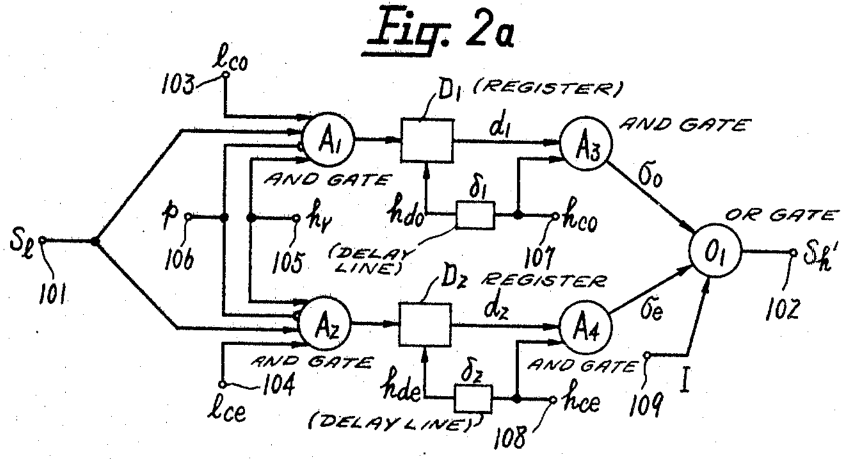
Figure 2B:
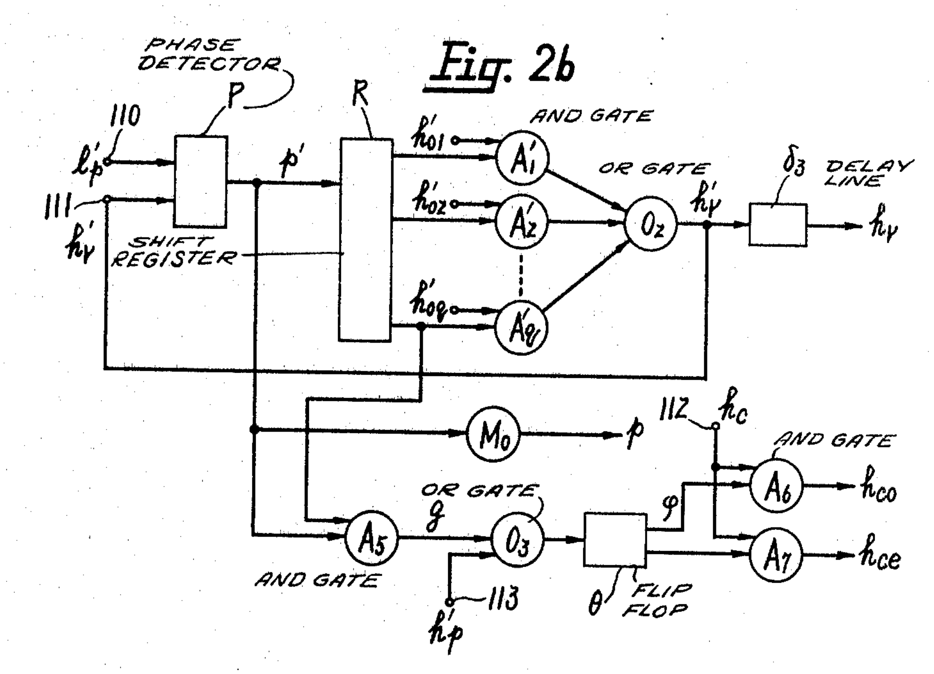

FIGURES 2*a* and 2*b* are circuit diagrams of an embodiment of the present invention to realize the independent synchronizing and speed converting functions of the system (*b–d*) illustrated in FIG. 1*a*.

Figure 3A:
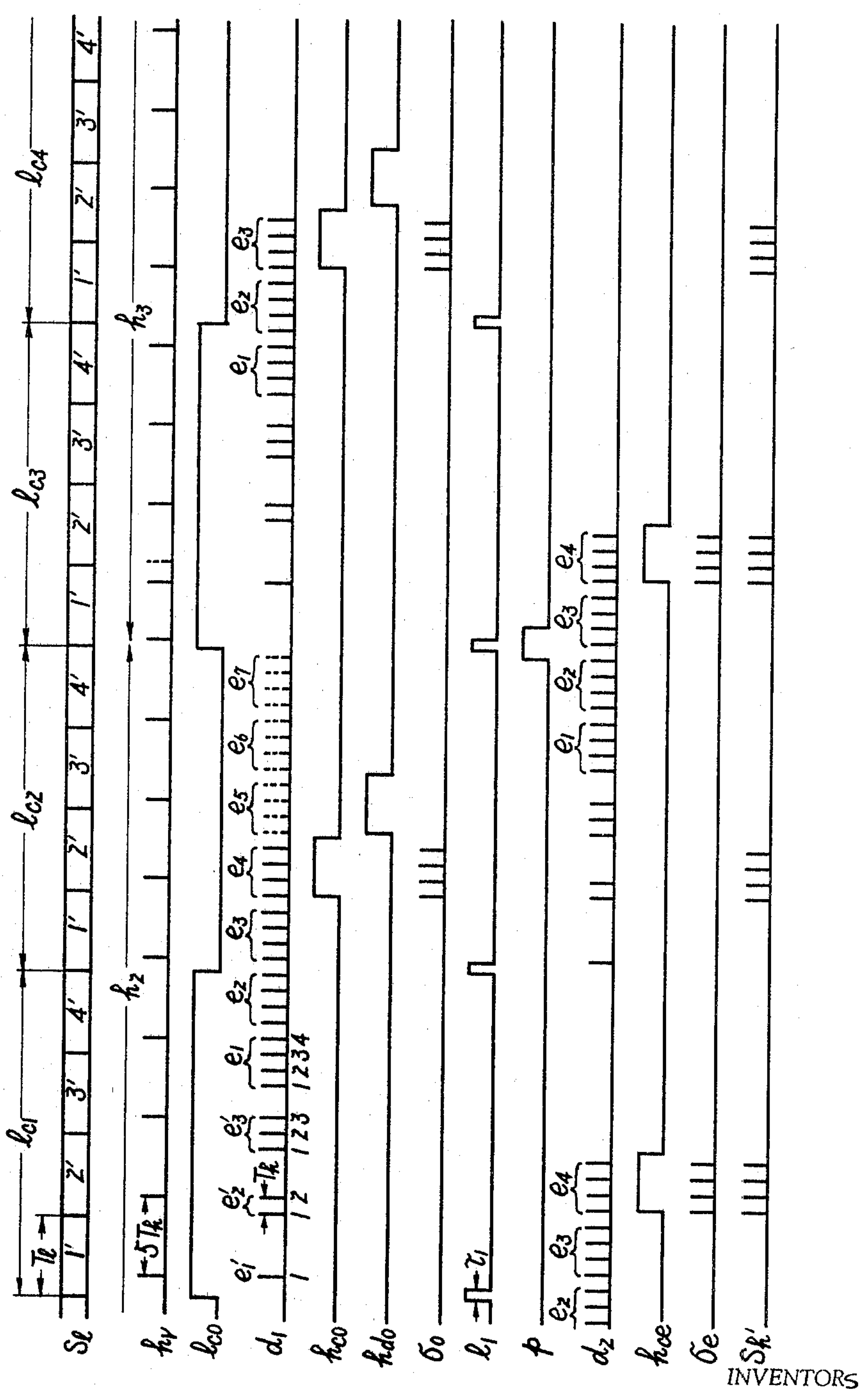

In FIGURES 2*a*, 2*b*, 101 is an input terminal for low speed PCM signals $S_l$. 102 is an output terminal at which high speed PCM signals $S_h'$ are obtained. $A_1$, $A_2$ . . . $A_g$ and $A'_1$, $A'_2$ . . . $A'_q$ are AND-gates. $D_1$ and $D_2$ are delay line registers. $\delta_1$ and $\delta_2$ are delay lines. $O_1$, $O_2$ and $O_3$ are OR-gates. 103 and 104 are input terminals for low speed timing pulses $l_{co}$ and $l_{ce}$, respectively. 105 is an input terminal for sub-high speed sampling pulses $h_\nu$. $h_\nu$ is a narrower pulse than the low speed pulses and a pulse sample by $h_\nu$ can be generated at the output side of an AND gate to which a wide pulse and $h_\nu$ are applied. $h_\nu$ functions to provide the accurate phase position. 106 is an input terminal for detected outputs P which is shown in FIGURE 3*a*. 107 and 108 are input terminals for high speed channel timing pulses $h_{co}$ and $h_{ce}$, respectively. $h_{do}$ and $h_{de}$ are delayed channel pulses whose phases are delayed approximately by the high speed channel pulse width from $h_{co}$ and $h_{ce}$, respectively. $d_1$ and $d_2$ are outputs of delay line registers $D_1$ and $D_2$, respectively. $\delta_o$ and $\delta_e$ are pulse outputs of the AND-gates $A_3$ and $A_4$, respectively. 109 is an input terminal for a special pulse pattern I which is to be inserted. Here, the suffix *o* represents an odd number and the suffix *e* represents an even number. They are indications for the distinction of odd and even numbers. For example, $l_{co}$ is an odd channel pulse and $l_{ce}$ is an even channel pulse. They appear alternately.

In FIG. 2*b*, $l'_p$ shows a low speed pilot pulse. "Pilot" means a function inserting the phase of the low speed channel pulse. (Hereinafter, the signs having primes (′) represent signals in phases more advanced approximately by the high speed bit cycle time T*h* than the indicated signals of the same signs having no prime (′). That is to say, $l'_1$ is a timing pulse with the more advanced phase than $l_1$.) $h'_{o1}$, $h'_{o2}$ . . . $h_{oq}$ are high speed bit pulses in the 1st, 2nd . . . *q*th phases, respectively. *q* kinds of timing pulse with different phases can be generated by applying the high speed clock rate into a *q* shift register and dividing. Each timing pulse has the phase shifted with one another by one time slot of the high speed clock rate. $h_\nu'$ and $h_\nu$ are high speed sampling pulses and the value of $_\nu$ (0, 1, 2 . . . *q*) coincides with one of the suffixes of $h'_{o1}$, $h'_{o2}$ and $h'_{oq}$. P is a phase detector consisting of an AND-gate and amplifier. *p′* is a detected output of the phase detector P. R is a shift register. M*o* is a monostable multivibrator. $\theta$ is a flip-flop. $\varphi$ is an output on one side of the flip-flop $\theta$. $h_c$ is a high speed channel timing pulse. $h'_p$ is a high speed pilot pulse. *g* is a shift pulse. $\delta_3$ is a delay line whose delay time is about $T_h$. 110 is an input terminal for $l'_p$. 113 is an input terminal for $h'_p$.

Figure 3B:
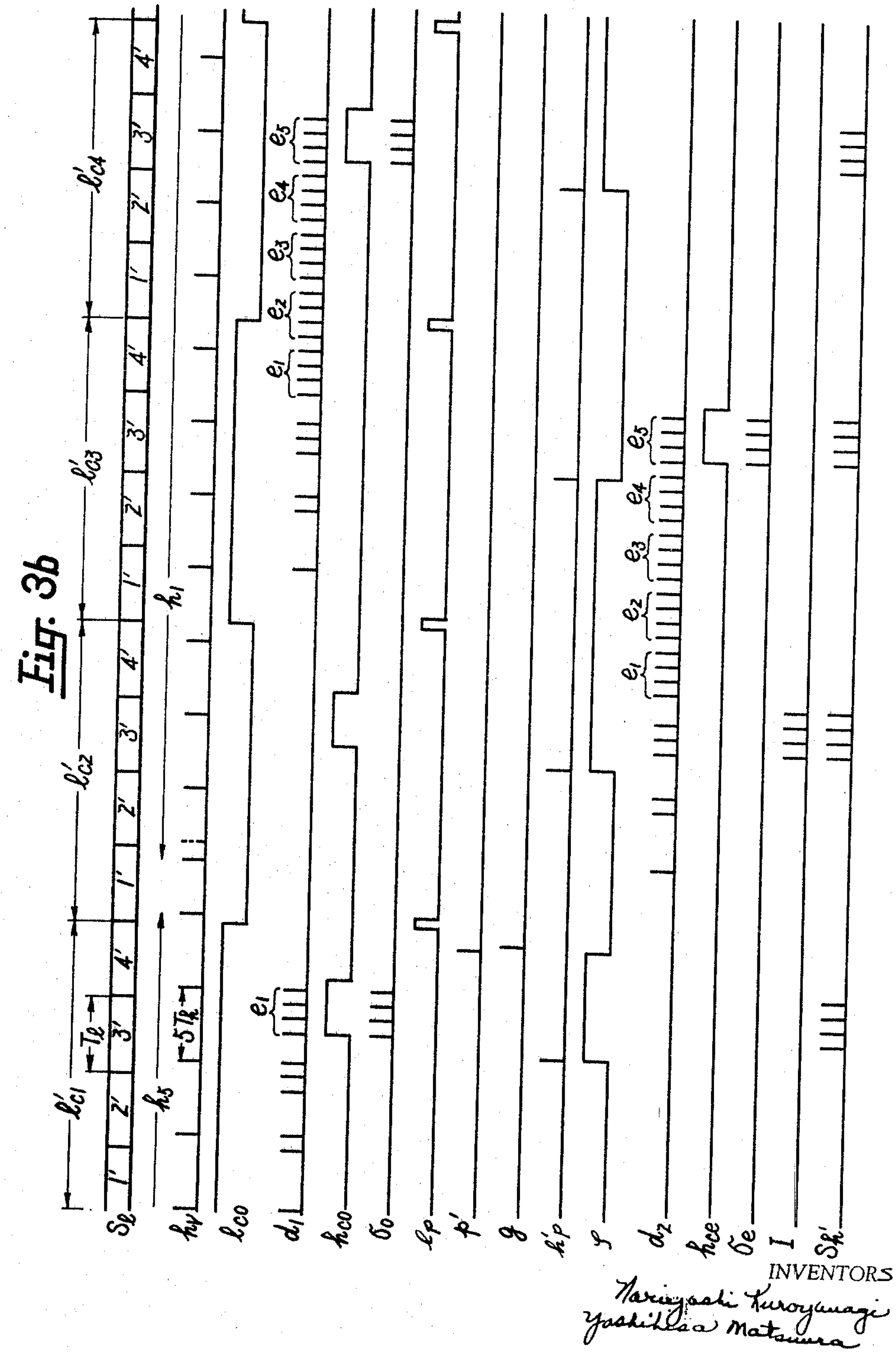

FIGURES 3*a*, 3*b* are supplementary explanatory diagrams for FIG. 2 and is a time arrangement diagram showing the phase relations of respective pulse signals.

Most of the signs are explained in FIG. 2. 1′, 2′, 3′ and 4′ are time slots in a channel of low speed PCM signals. It is assumed here that one channel consists of four time slots and multiplexes five low speed PCM systems. Generally, it is assumed that the number of systems to be multiplexed is larger than the number of bits in one channel. Further, each bit pulse is assumed to be a pulse signal (non-return zero signal or NRZ signal) of a duty factor of 100%. Here, there shall be considered the case of obtaining high speed PCM signals by multiplexing five systems of low speed PCM signals of the same number of channels. It corresponds to the above described case of $q=5$. $e_1$, $e_2$ . . . $e_5$ are the first, second . . . fifth pulse trains, respectively.

First of all, FIGS. 2*a*, 2*b* and 3*a* shall be explained. If the second output of the shift register R is "1" (binary logical value) and the others are "0" (binary logical value), then the AND-gate $A'_2$ will become conductive because the lower input for $A_2'$ is "1" and the input timing pulse $ho'_2$ can pass $A'_2$. The high speed bit pulse $h'_{o2}$ will be transmitted through the $A'_2$ and the OR-gate $O_2$ and the sub-high speed clock pulses in this case. That is to say, $h_\nu'$ and $h_\nu$ will become $h'_2$ and $h_2$, respectively. The sub-high speed sampling pulse $h_\nu$ will be applied to the AND-gates $A_1$ and $A_2$ from the terminal 105. The detected output *p* (*p* functions to detect the coincidence of the phases of $l'_p$ and $h'_\nu$) is normally 0. For each low speed channel timing pulse, either one of the low speed channel pulses $l_{co}$ and $l_{ce}$ will be "1" and the other will be "0." Therefore, in FIG. 3*a*, the bit pulses 1′, 2′, 3′ and 4′ of the low speed channel $l_{c1}$ will be transmitted to the delay line register $D_1$ through the AND-gate $A_1$ to which are applied the low speed channel pulse $l_{co}$ and sub-high speed sampling pulse $h_\nu$ ($h_2$). In the low speed channel $l_{c1}$, as $l_{ce}$ is 0, the AND-gate $A_2$ will be non-conductive. As the delay line register $D_1$ and $D_2$ are of two-terminal connection as described later (FIG. 12), the input signal as it is will become also an output signal, a part of the input signal will be transmitted into the delay line, will be reflected and will be back again to the output terminal. (In FIG. 12, the output terminal is 231, where the input is transmitted directly and the reflection pulse through 233 is also transmitted.) The logical product output of the low speed bit pulse 1′ and high speed sampling pulse $h_2$ will become the output $e'_1$ on the *d* line in FIG. 3*a*. This information coincides with the information of the low speed bit pulse 1′ and is represented by 1. This output $e'_1$ will be delayed by $4T_h$ (choosing the delay time of the delay line to be $2T_h$) and will appear as the output 1 in the output $e'_2$. The output 2 in the output $e'_2$ is a logical product output of the low speed bit pulse 2′ in $l_c$ and high speed sampling pulse $h_2$. Consequently, $l'_2$ consists of two pulses 1 and 2 which are arranged at the interval $T_h$ where 1 has the information of 1′ in $l_c$, and 2 has the information of 2′ in $l_{c2}$. In the same manner, the once applied pulses into the delay line register will produce pulses delayed by $4T_h$ and therefore $e'_1$, $e'_2$, $e'_3$, $e_1$, $e_2$ . . . will be obtained in turn.

The pulse train $e_1$ is a pulse group in which narrower width pulses 1, 2, 3 and 4 having information corresponding to all the bit pulses 1′, 2′, 3′ and 4′ in the low speed channel $l_{c1}$ are arranged at intervals of $T_h$. After the pulse train $e_1$ is generated, pulse trains $e_2$, $e_3$ . . . $e_7$, given exactly the same information at a cycle time of $4T_h$, will be generated as an output of the delay line register.

Here, the delay time $T\Delta$ of the delay line in the delay line register is selected to be (the delay time including the reflection is $2T_\Delta$):

$$T\Delta=\frac{n-1}{2}T_h \qquad (3)$$

Generally, if a relation of $$n_m \geqq (n_b+1) \qquad (4)$$

is satisfied between the number $n_b$ of bits in one channel and the number $n_m$ of multiplexed low speed PCM systems, such pulse trains as are shown on the $d_1$ line will be able to be arranged. Dividing ratio *q* does not always coincide with the multiplexing number $n_m$, because *q* should be selected to the value of $(n_b+1)$ corresponding to the $n_b$ bits (one channel time slot) pulse insertion. In case the Formula 4 is not satisfied, if the signal in one channel is divided (for example, into two) and is applied to separate delay line registers in turn, the same pulse trains can be arranged.

Here the high speed bit pulses of the high speed sampling pulses $h_{\nu 1}$ and output $d_1$ are all represented by lines. But, in fact, it is assumed that they have limited pulse widths ($\simeq T_h/2$) from the positions of the indicated lines. Now, when such a high speed channel timing pulse $h_{co}$ (in a certain synchronous relation with the high speed bit timing pulses) which covers as encloses the total time slots of the pulse train $e_4$ is applied to the AND-gate $A_3$ in response, only the pulse train $e_4$ is taken out and becomes a pulse output $\sigma_o$ forming a high speed PCM signal $S_h$.

Here, the high speed channel pulse $h_{co}$ is delayed by $2T_\Delta 4T_h$ by use of the delay line $\delta_1$, and is applied to the reset input terminal of the delay line register $D_1$ and erases all the pulse trains $e_5$ to $e_7$ indicated by the dotted lines. Then, for the low speed channel pulse $l_{c2}$, substantially the same function are applied through the AND-gates $A_2$ and $A_4$. A circuit group of $A_1$, $D_1$, $A_3$ and another group of $A_2$, $D_2$, $A_4$ used alternately every channel pulse $l_{c1}$, $l_{c2}$.

That is to say, only the pulse train $e_4$ in the output $d_2$ of the delay line register is read out with the high speed channel timing pulse $h_{ce}$ and a pulse output $\sigma_e$ is obtained.

A low speed pilot pulse $l_p$ with pulse width $T_p(<T_h)$ is prepared in a phase equal to that of the leading edge of each low speed channel signal. If a relation $T_1>5T_h$ is assumed, the phase difference between this low speed pilot pulse $l_p$ and the high speed sampling pulse $h_2$ will reduce with the lapse of time until both pulses coincide with each other. That is to say, in the case of FIG. 3*a*, detected output *p′* is obtained in the phase of the leading edge of the low speed channel $l_{c3}$. The detected output *p′* is applied to the monostable multivibrator $M_o$ and has the pulse width expanded here so as to be a detected output $p$. As $l'_p$ and $h'_2$ precede $l_p$ and $h_2$, respectively, the leading edge of the detected output P will be in a phase preceding the low speed pilot pulse $l_p$ and will be of such wave form as to enclose the low speed pilot pulse $l_p$ and high speed sampling pulse $h_2$. Due to this detected output $p$, the AND-gate $A_1$ becomes nonconductive. At this time, the high speed sampling pulse $h_\nu$ circulates. That is to say, $p'$ is applied to the shift register R, the output of R shifts from the second to the third and the sampling pulse $h_\nu$, varies from $h_2$ to $h_3$. As indicated with $h_\nu$, in FIG. 3$a$, in the phase of 1′ of $l_{c3}$, the high speed sampling pulse $h_2$ in order to appear in the position of the dotted line will disappear and instead $h_3$, of a phase advanced by $T_h$ (or delayed by $4T_h$), will appear.

As the phase of the high speed sampling pulse $h_\nu$ is thus quickly varied, wherever the high speed sampling pulse $h_\nu$ will coincide with the leading (or falling) edge of the low speed bit pulse, indefinite performance of the AND-gate $A_1$ or $A_2$ can be avoided. Further, as the high speed sampling pulse $h_3$ of a phase delayed by $4T_h$ is used, thereafter the group pulse $e_3$, advanced just by one cycle time, can be read out by the reading-out channel pulse $h_{co}$.

Thus, whenver the detected pulse $p$ is generated, the high speed sampling pulse $h_\nu$ varies such as $h_1, h_2, \ldots h_5$ (in such case, $q=5$).

As shown in FIG. 3$b$, when the high speed sampling pulse $h_5$ is used, the pulse train $e_1$ is read out. As there is no pulse train preceding the pulse train $e_1$, when any further phase variation occurs, it is necessary to insert the insertion pulses I. That is to say, when the detected output $p'$ is obtained while the high speed sampling pulse $h_5$ is being generated, a shifting pulse $g$ is obtained together with the detected output $p$ through the AND-gate $A_5$.

As shown in FIG. 3$b$, the high speed pilot pulses $h_p'$ generate one bit in each sub-high speed channel of this system. As the output of the flip-flop $\theta$ is inverted by $h'_p$ as shown in FIGS. 2$b$ and 3$b$, the high speed channel timing pulse $h_c$ will be transmitted alternately as $h_{co}$ and $h_{ce}$ through the AND-gates $A_6$ and $A_7$. The shifting pulses $g$ serve to disturb this order once. That is to say, if $g$ is generated just after the high speed channel timing pulse $h_{co}$, $h'_p$ is applied to the flip-flop, before the high speed channel pulse $h_c$ is generated next, therefore, the output of the flip-flop does not vary, $h_{co}$ is generated once again and then $h_{ce}$ is generated. As the detected output $p'$ is generated at the leading edge of the low speed channel $l'_{c2}$ as shown in FIG. 3$b$, the high speed channel timing pulse $h_{co}$ is generated successively twice.

On the other hand, the output $d_1$ of $h_{do}$ will vanish at the phase of the low speed channel $l'_{c2}$ by the erasing pulse $h_{do}$. Therefore, a special pattern I of one channel which is synchronized with the second reading out channel pulse $h_{co}$ and inserted through the OR-gate $O_2$.

The information of the low speed channel $l'_{c2}$ is arranged as the output $d_2$ through the AND-gate $A_2$ and delay line register $D_2$ but is read out with the high speed channel pulse $h_{ce}$ which is delayed by one channel cycle time by the shifting pulse $g$, once and it therefore coincides just to the phase of the pulse train $e_5$ in the line $d_2$. Further, in such case, the high speed sampling pulse $h_\nu$ varies from $h_5$ to $h_1$ and the phase is delayed by $4T_h$. Thus, the initial state of reading out the pulse train $e_5$ by applying the high speed sampling pulse $h_1$ will be restored and, if $h_\nu$ is varied such as $h_1, h_2 \ldots h_5$ with the variation of the phase with the lapse of time, the insertion pulse I of one channel is again inserted and the change from $h_5$ to $h_1$ takes place. By repeating this process, the high speed PCM signals $S_h$ can be obtained.

If the number of systems to be multiplexed becomes larger than the number of bits in one channel, it will become impossible to make pulse trains. But, if the delay line registers $D_1$ and $D_2$ are increased from two to three or more, pulse trains will be able to be made by the same principle and therefore a speed converting function will be able to be realized.

Figure 4:
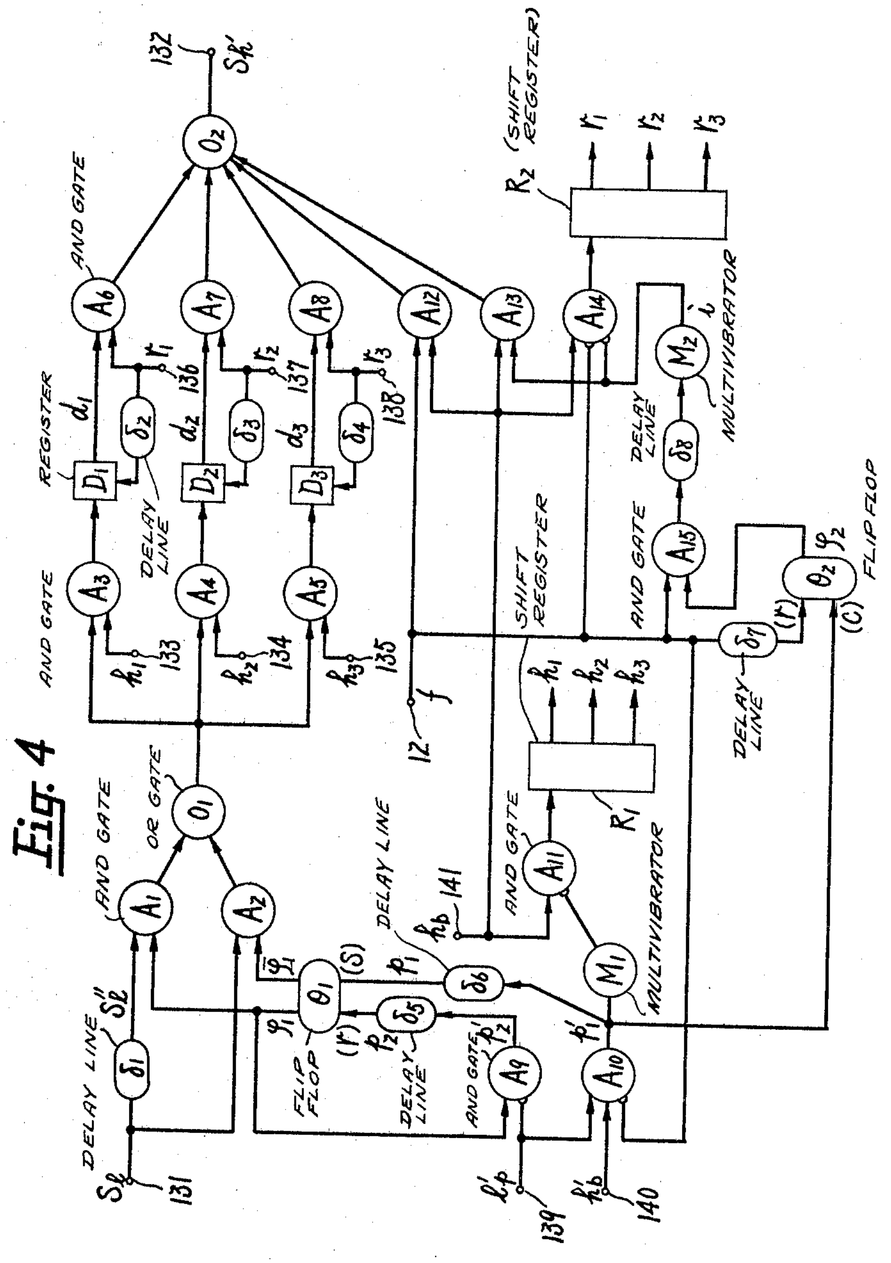

FIG. 4 is a circuit diagram of another embodiment of the present invention. This circuit provides independent synchronization and speed converting functions in the case of the system ($a$–$c$) (a one-bit insertion system) explained in FIG. 1$b$.

In the drawing, 131 is an input terminal for low speed PCM signals $S_l$. 132 is an output terminal at which high speed PCM signals $S_h$ are obtained. 133, 134 and 135 are input terminals for high speed sampling pulses $h_1$, $h_2$ and $h_3$. 136, 137 and 138 are input terminals for read sampling pulses $r_1$, $r_2$ and $r_3$, respectively. 139 is an input terminal for low speed pilot pulses $l'_p$. (The phase of the signal with a prime (′) is a little more advanced than the phase of the signal without the prime (′).) 140 and 141 are input terminals for high speed bit timing pulses $h'_b$ and $h_b$, respectively. 142 is an input terminal for frame specifying pulses $f$. $A_\nu$ ($\nu$ is a general indication of an integer here and hereinafter) is an AND-gate. $O_\nu$ is an OR-gate. $\alpha_r$ is a delay line. $M_\nu$ is a monostable multivibrator. $D_\nu$ is a delay line register. $d_\nu$ is its output. $R_\nu$ is a shift register. $\theta_\nu$ is a flip-flop. $\varphi_\nu$ and $\overline{\varphi}_\nu$ are affirmative and inverse outputs of the flip-flop $\theta_\nu$. $s$, $r$ and $c$ are setting, resetting and counting input terminals of the flip-flop $O_\nu$, respectively, $i$ is an output specifying pulse insertion. $S_l''$ is a delayed low speed PCM signal a little delayed from $S_l$.

Figure 5A:
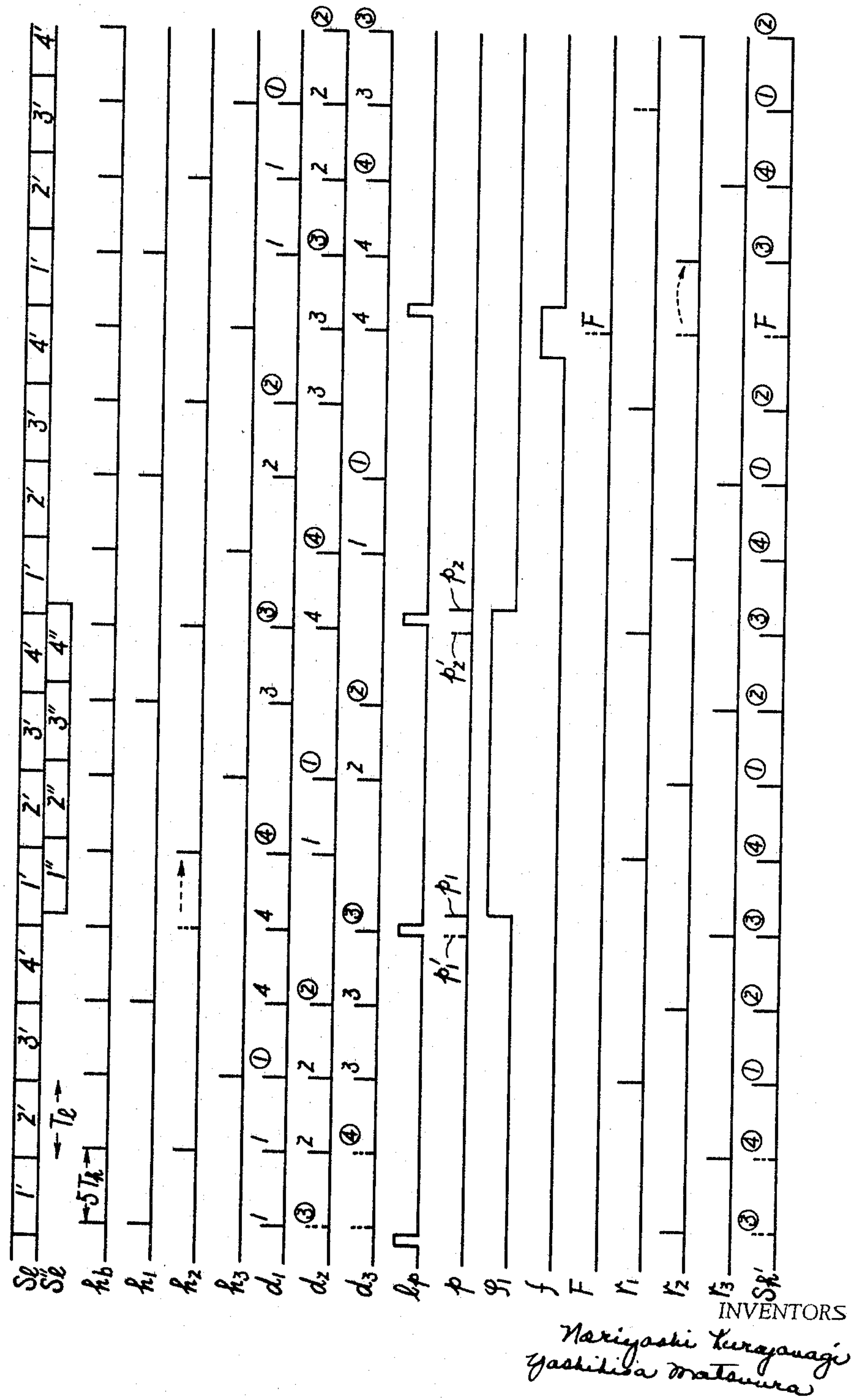

FIGS. 5$a$, 5$b$ are supplementary explanatory diagrams of FIG. 4 and are time arrangement diagrams showing the phase relation or respective pulse signals. Most of the signs are as explained with reference to FIG. 4. The low speed PCM signal $S_l$ has one channel formed of four bits to which bit indications of 1′, 2′, 3′ and 4′ are attached for convenience.

The circuit in FIGS. 5$a$ and 5$b$ shall be explained by using FIG. 5.

As the flip-flop $\theta_1$ is normally reset, the AND-gate $A_2$, to which an inverse output $e_1$ is applied, is conductive. The low speed PCM signal $S_l$ will be applied to the input terminal on one side of each of the AND-gates $A_3$, $A_4$ and $A_5$. On the other hand, as the AND-gate $A_{11}$ is also normally conductive, the high speed bit pulse $h_b$ is applied to the shift register and $R_1$ produces three-phase outputs $h_1$, $h_2$ and $h_3$. These three-phase outputs become high speed sampling pulses and are applied to $A_3$, $A_4$ and $A_5$.

The narrow width pulse outputs of the AND-gates $A_3$, $A_4$ and $A_5$ are applied to the day line registers $D_1$, $D_2$ and $D_3$, respectively, and stored. For the delay line registers $D_1$, $D_2$ and $D_3$ are used a circuit that will be explained in FIG. 12. At the upper left side in FIG. 5$a$, the logical product output of a bit signal 1′ in $S_l$ and $h_1$ becomes three pulses 1, 1′ and ① in response to the information 1′ in the $S_l$ line. The pulse to be produced in the 4th order time slot will vanish because $\tau_\nu$ is applied as a reset input through the delay lines $\delta_2$, $\delta_3$, and $\delta_4$. The phase difference between the adjacent ones of these three pulses is selected to be equal to the cycle time of the sub-high speed bit pulse $h_b$. (In such case, by taking the multiplexing of five low speed systems into consideration, the delay time $T_\Delta$ of the delay line is 25 $T_h$ from Equation 3.) As the high speed sampling pulse $r_1$ is arranged in the same phase as tri-divided the above described pulse ①, it can be read out just at the AND-gate $A_6$ and consists of part of a sub-high speed pulse stream $S'_h$ as shown in FIG. 5$a$.

In such a case, only the last one of the three pulses 1, 1 and ① obtained on the $d_2$ line is used. In the same manner, three pulses 2, 2 and ② having information corresponding to 2′ of $S_l$ is obtained on the $d_2$ line and only the pulse ② is transmitted by the high speed sampling pulse $r_2$ to the output terminal through the OR-gate $O_2$.

Thus, the output pulses $S_h$ are delivered in turn. (The pulses read out have circles attached to their numbers.)

With the lapse of time, the phase of the high speed bit pulse $h_b$ (or $h_\nu$) will gradually advance with the low speed PCM signal $S_1$. When the high speed bit pulse $h_b$ has approached the boundary of the low speed bit pulse represented by $l_p$, the AND-gate $A_{10}$ operates as a phase detector and a detected output $p'_1$ is obtained from $l'_p$ and $h_b'$. $p'_1$ is a little more advanced in phase than the logical product output of both $l_p$ and $h_b$. The flip-flop $\theta_1$ will be set by using an output $p_1$ with a phase a little delayed from $p'_1$. On the other hand, the monostable multivibrator $M_1$ is triggered by the output $p'_1$ and the input to the shift register $R_1$ is inhibited only once by a wide width pulse output of $M_1$.

Accordingly, at the instant when the detected output $p'_1$ is obtained, the high speed sampling pulse vanishes only once as by the dotted line shown on the $h_2$ line. On the other hand, output $p_1$, changes from "0" to "1" by the set input $P_1$ to $\theta_1$ and the AND-gate $A_1$ to which the output $\varphi_1$ is applied becomes conductive instead of $A_2$. A delayed low speed PCM signal $S''_1$ (1', 2', 3' and 4') with a phase a little delayed from $S_l$ by delay line $d_1$ has been applied to the AND-gates $A_3$, $A_4$ and $A_5$ through OR gate $O_1$ after the instant when $P_1$ occurred. In FIGS. *5a*, *5b*, the time slots for $S''_1$ are indicated only for the phase in which it should be used. That is to say, in the time slots represented by 1'', 2'', 3'' and 4'', the AND-gate $A_2$ is nonconductive therefore, the outputs of $S_l$ of 1', 2' . . . cannot be used. When the high speed sampling pulse $h_\nu$ has come to a phase near the boundary of the low speed PCM signal $S_l$, the logical product output of both $h_\nu$ and $S_l$ will become indefinite and there is a misoperation. Therefore, in order to prevent it, a phase shift of $S_1$ to $S''_1$ is used. After the flip-flop $\theta_2$ was set and a plurality of low speed channel signals have been transmitted, it will reach a phase when $l_p$ and $h_b$ do not superimpose on each other then, the AND-gate $A_9$ operates and output $p'_2$ is applied to terminal $\nu$ to reset $\theta_1$ and reset the flip-flop $\theta_1$. In FIG. *5a* after one low speed channel (4 bits), the flip-flop $\theta_1$ is reset, $\varphi_1$ will vanish and $S_l$ is applied again to the AND-gates $A_3$, $A_4$ and $A_5$. The subsequent phase of the high speed sampling pulse $h_\nu$ has already been far from the phase near the boundary of the low speed PCM signal and therefore there will be no misoperation. Further, just after the flip-flop $\theta_1$ is set, the high speed sampling pulse $h_\nu$ disappears once and therefore, the second output ① of the two pulse outputs 1 and ① obtained in the output $d_2$ of the delay line register $D_2$ will be read out with the sampling pulse $r_2$. Thereafter, only two pulses are generated in response to the same low speed PCM signal and the second pulse is used. The delay lines $\delta_5$ and $\delta_6$ are inserted so that misoperation will occur at the phase shift $S_l \leftrightarrows S''_1$.

Then, as a frame specifying pulse $f$ having both pulse width and phase to enclose the high speed bit pulse $h_b$ is applied to the *not* input terminal of the AND-gate $A_{14}$, it once erases the input to the shift register $R_2$ and shifts the reading-out phase as shown by the dotted line on the $r_2$ line in FIG. *5a*. In the phase when $f$ is applied, the reading-out function stops and, from the next phase delayed by 1 bit ($5T_h$), the reading out is resumed. In the state where the output is $d_2$ it has consisted of two pulses 3 and ③, the delayed sampling pulse $r_2$ is used, therefore, the output $d_2$ increases to the three pulses 3, 3 and ③, the third pulse is read out with $r_2$ and the initial state is restored. In the phase to which $f$ is added, an arbitrary signal can be transmitted to the output side through the AND-gate $A_{12}$. Here, it is shown with the dotted line F on the $S_h$ line and such structure as a generating output "1" is shown in the circuit of FIG. 4. The cycle time for applying $f$ is a constant framing cycle time of the high speed clock rate but has no relation to the low speed clock rate.

Now FIG. *5b* shall be explained. Due to the frequency difference between $S_h$ and $S_l$, in the state before the frame specifying pulse $f$ in FIG. *5a* might be applied, the second detected output $p'_1$ is generated in some cases. The operation in such cases is shown in FIG. *5b*.

In this case, substantially in the same manner as in the case of FIG. *5a*, the flip-flop $\theta_1$ is once set and is reset subsequently. The output $d_\nu$ of the delay line register becomes only one pulse output for the information of the same low speed PCM signal. This pulse is read out with $r_\nu$. If once the frame specifying pulse $f$ is applied, the flip-flop $\theta_2$ is always reset through the delay line $\delta_7$. $p'_1$ is applied to the other input terminal $c$ of the flip-flop $\theta_2$. The inputs to the terminal $c$ perform the counting operation. Whenever two sequential inputs are applied, the flip-flop $\theta_2$ is reset to its original state. While the flip-flop $\theta_2$ is reset, the inverse output $\bar{\varphi}_2$ is transmitted to the AND-gate $A_{15}$. Consequently, after the previous frame pulse was applied, if the flip-flop $\theta_1$ has been set twice, according to the phase difference over two bits being caused between $S_l$ and $h_b$, the flip-flop $\theta_1$ is reset and $\bar{\varphi}_2$ must be generated. If the frame specifying pulse $f$ is applied in this state, first of all, due to $f$, in the same manner as is explained in FIG. *5a*, the output $r_\nu$ of the ring counter $R_2$ vanishes once and the frame pulse F is transmitted to the output terminal 2. Further, in such case, an output $i$, which is a function specifying the insertion, is produced as delayed by about 1 bit ($5T_h$) from $f$ through the AND-gate $A_{15}$, delay line $\delta_8$ and monostable multivibrator $M_2$. This output $i$ will be applied to the AND-gates $A_{14}$ and $A_{13}$, inhibits occurrence of $r_\nu$ from ring counter $R_2$ once more (twice together with the time by $f$) and transmits the insertion pulse I to the output terminal 132 through the AND-gate $A_{13}$ and OR-gate $O_2$. In case "O" is to be given to the insertion pulse I, the AND-gate $A_{13}$ may be removed. Thus, the reading-out sampling pulse $r_\nu$ vanishes twice and is shifted by 2 bits ($10T_h$). Here, in response to the shift of $r_\nu$, the output $d_\nu$ of the delay line register corresponding to the same information of the low speed PCM signal increases from one to three and only the third one is read out. That is to say, the initial state is restored.

Further, in the phase to which the frame specifying pulse $f$ is applied, $f$ is branched and transmitted to the *not* input terminal of the AND-gate $A_{10}$ so that no detected output $p'_1$ may be generated. If the pulse width of $l'_p$ is made properly wide, even if $f$, $l'_p$ and $h'_b$ coincide with one another, the phase in which the detected output $p'_1$ is generated will be only delayed by one channel interval ($4T_1$) but there will be no influence on the circuit operation. Thus, depending on whether the flip-flop $\theta_1$ is set once or twice, only the frame pulse F is inserted or both of the framing pulse F and insertion pulse I is inserted and independent synchronization can be realized. Further, the width of each pulse of the output $S_h$ is made narrow enough. 4 bits of the other low speed PCM system are interleaved between the respective pulses so that the final high speed PCM signal may be obtained.

Thus, the independent synchronizing and speed converting functions in the bit multiplexing system can be realized at once.

There is another important feature in the circuit of FIG. 4 embodying the system (*a*). That is to say, two or more low speed PCM systems may be synchronized with each other. In such a case, most of the circuits in FIG. 4 can be used in common for the purpose of multiplexing the plurality of low speed PCM signals.

This is a feature which can not be realized with the elastic memory circuit or like circuits.

Figure 6:
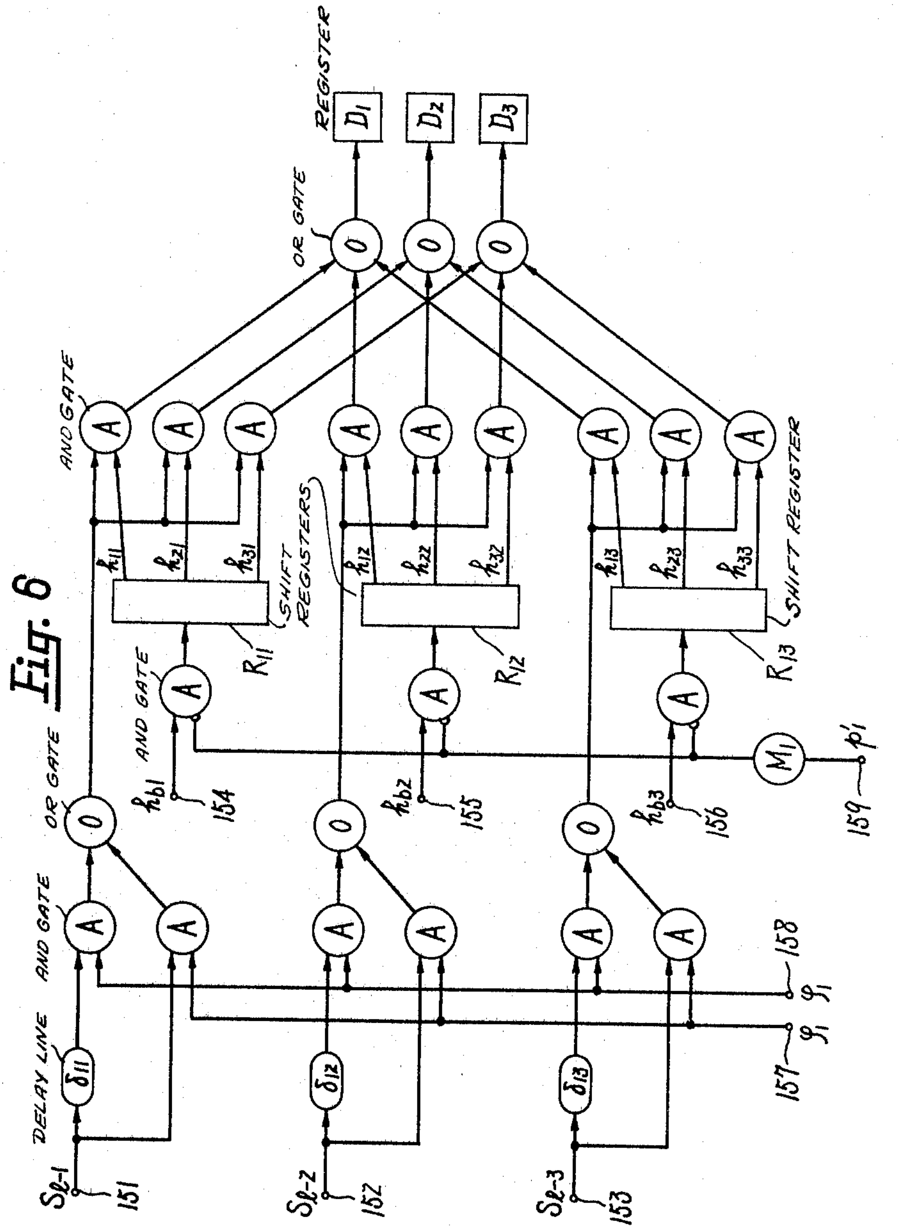
FIG. 6 is a supplementary explanatory diagram of the system shown in FIG. 4.

FIG. 6 is a supplementary explanatory diagram of FIG. 4 and is a circuit diagram required until three low speed PCM signals $S_{1-1}$, $S_{1-2}$ and $S_{1-3}$ synchronized with one another are transmitted to the delay line registers $D_1$, $D_2$ and $D_3$ in FIG. 6. Here delay lines $\delta_{11}$, $\delta_{12}$ and $\delta_{13}$ and shift registers $R_{11}$, $R_{12}$ and $R_{13}$ are three times as many as in the case of FIG. 4. Further, the illustrated numbers of AND-gates and OR-gates are required. In other respects, the circuit of FIG. 4 is utilized. In the drawing, 151, 152 and 153 are input terminals for three low speeed PCM signals $S_{l-1}$, $S_{l-2}$ and $S_{l-3}$, respectively. 154, 155 and 156 are input terminals for high speed bit pulses $h_{b1}$, $h_{b2}$ and $h_{b3}$, respectively. ($h_{b2}$ and $h_{b3}$ are phase delayed by $T_h$ from $h_{b1}$ and $h_{b2}$, respectively, and $h_{b1}$ is equal to $h_b$ in FIG. 6.) 157 and 158 are output terminals of the flip-flop $\theta$. 159 is an input terminal for the detected output $p'_1$.

Figure 7:
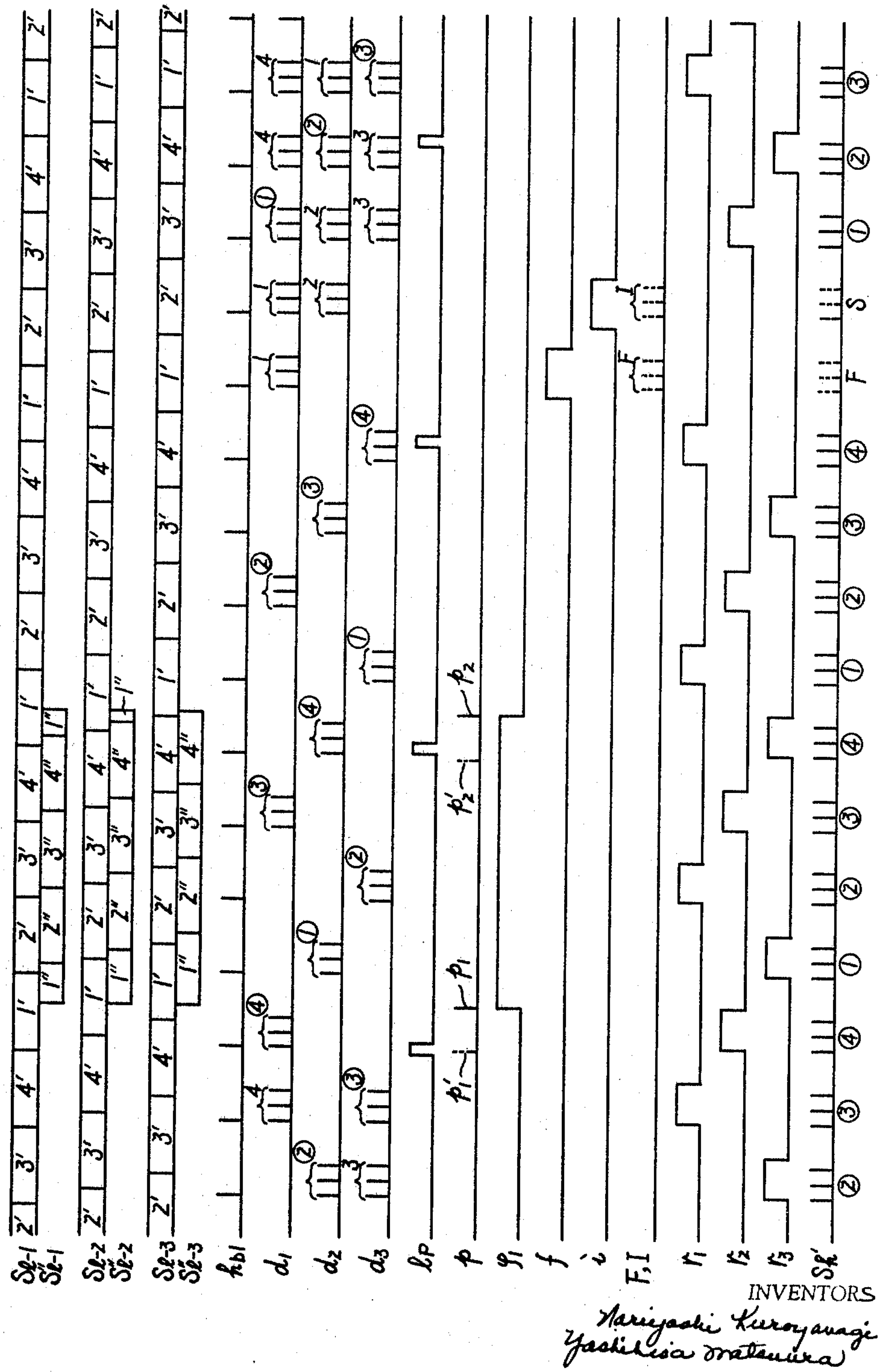
FIG. 7 is a supplementary explanatory diagram of FIG. 6.

FIG. 7 is a supplementary explanatory diagram of FIG. 6 and shows the phase relation of respective pulse signals. The signs of the respective parts are the same as in FIGS. 5 and 6. Here the outputs of the delay line register $d_\nu$ are arranged in each group of three pulses. At first, three of such groups (for example, 1, 1, ① in line $d_1$) are made. But, once the flip-flop $\theta_1$ is set, the groups will become two, 1, 1. Further, when it is set once more, they will become one, ①. In this state, if the frame specifying pulse $f$ is applied, the initial state will be restored. In such a state that two or three groups are generated, only the last group which is a wide width pulse for this reading function.

Figure 5B:
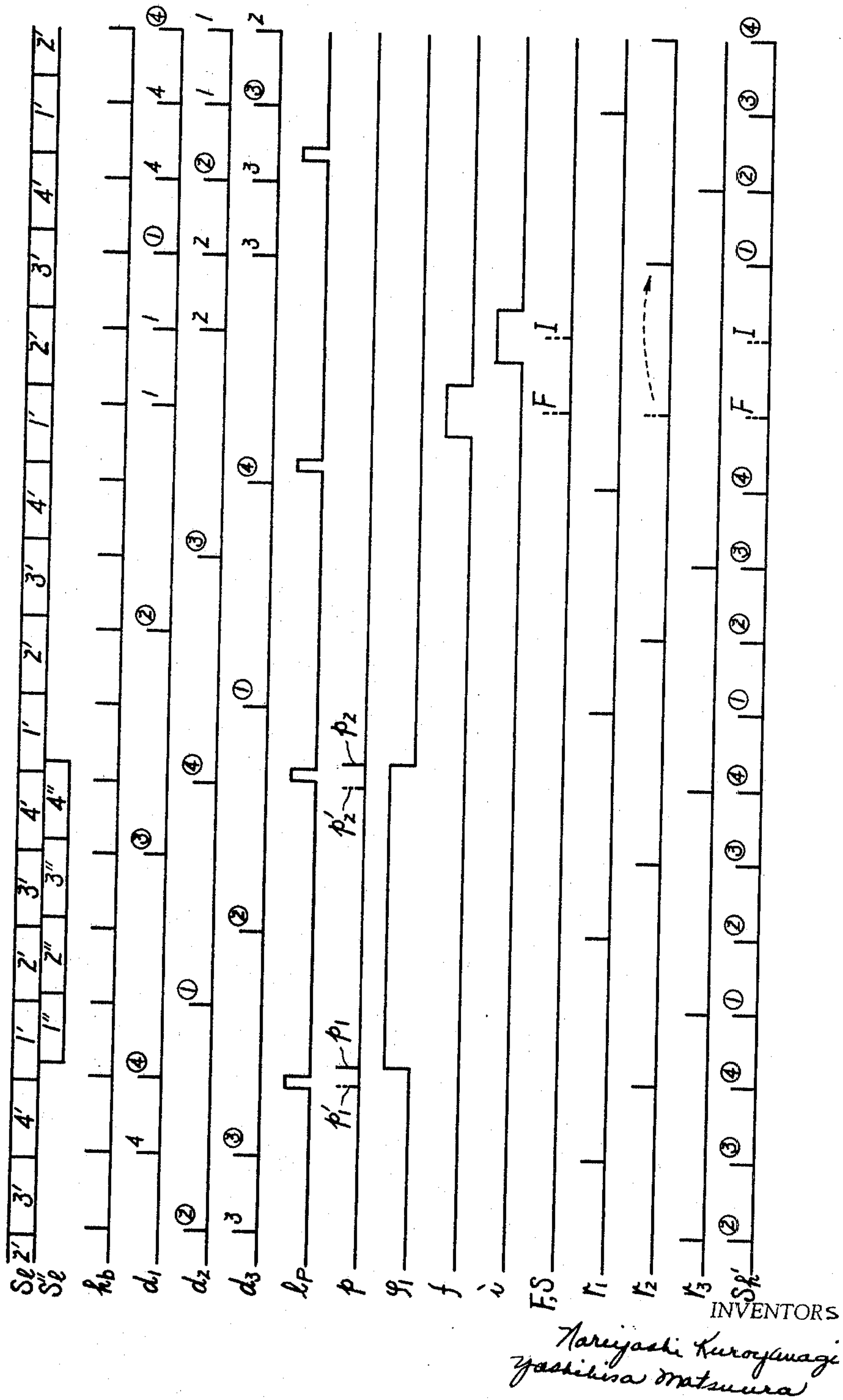

FIG. 7 shows the case of FIG. 5*b* by assuming the inputs of only three systems to be applied to the delay line register. That is to say, at the left end in the drawing, the flip-flop $\theta_1$ is once set. The time when the output $\varphi_1$ is generated is the timing position at which the flip-flop $\theta_1$ is set for the second time. Then the frame specifying pulse $f$ and the pulse insertion specifying output $i$ are later produced and at this time the initial state is again restored. As the phases in which $p_1$ and $p_2$ are to be generated are delayed from $p'_1$ and $p'_2$, respectively, the phases of $p'_1$, $p'_2$ are chosen to precede the phases of $p_1$ and $p_2$, respectively, so that the flip-flop $\theta_1$ may be used in common, the phases in which the low speed PCM signals $S''_{l-1}$, $S''_{l-2}$ and $S''_{l-3}$ are sampled is equal to one another. Three groups of sub-high speed pulses shown as $3xS'_h$ in the figure have information of the three low systems systems are arranged as a group as adjacent to one another for the high speed PCM signal $S_h$. The other two sub-high speed pulses corresponding to the information of the other two systems will be inserted between adjacent groups $S'_hx3$.

Here only the system (*c*) (one-bit insertion system) has been explained. However, the system (*d*) (one-channel insertion system) can be also realized in substantially the same principle by providing ($\alpha+1$) delay line registers where $\alpha$ is the bit number forming one channel.

Thus, speed converters of various synchronization systems can be realized with simple circuit formations according to the present invention.

If the principle of the present invention is applied, a system for multiplexing $n$ low speed PCM systems into a high speed PCM system generally by adding arbitrary numbers of insertion pulses in an arbitrary bit arrangement can be realized.

Now, the technique separating the original pulse stream of a low speed PCM system from a high speed PCM pulse stream which consists of $n$ low speed PCM systems will be explained.

Figure 8:
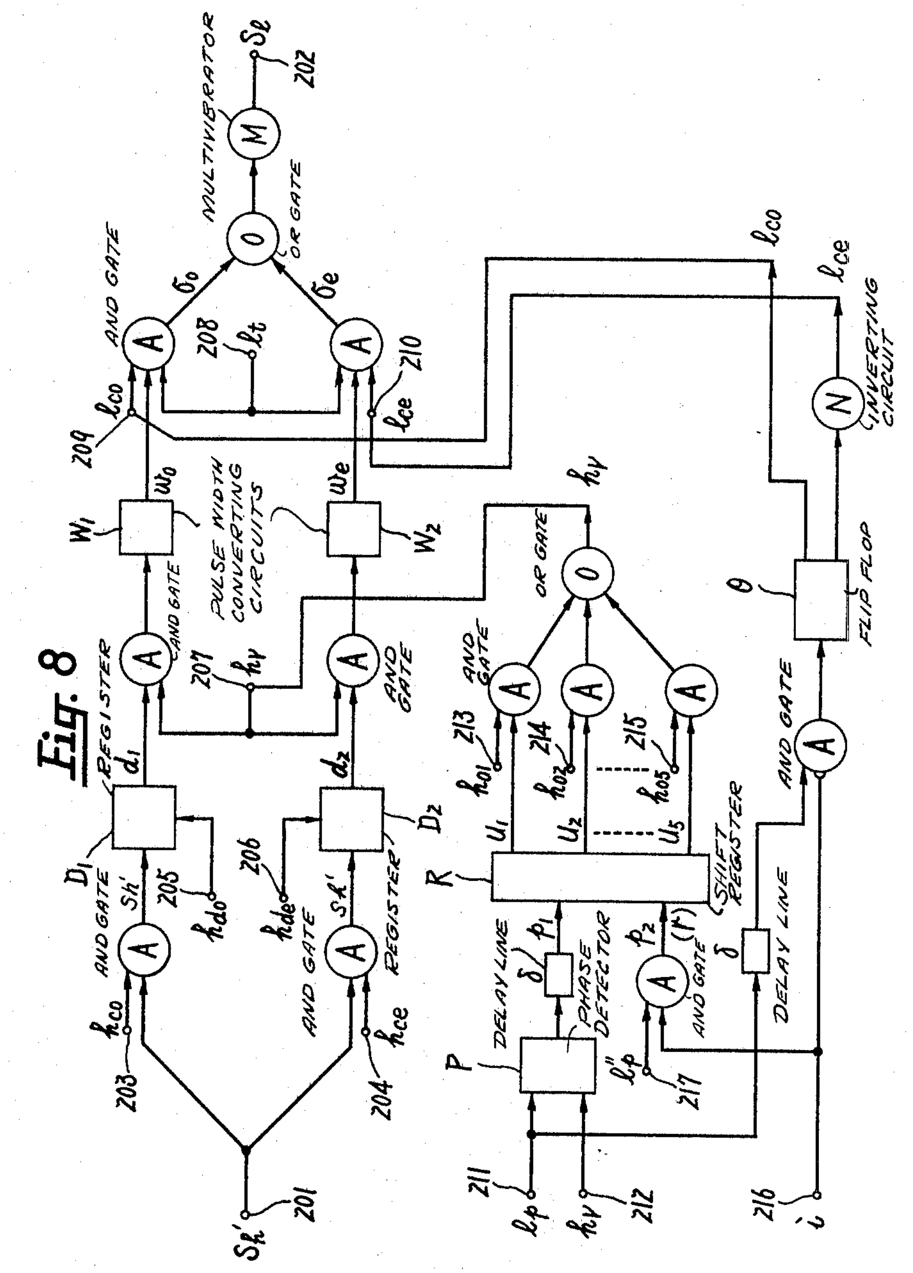
FIG. 8 is a receiving circuit diagram of another embodiment of the system *b–d* of the present invention.

FIG. 8 is a block diagram of an embodiment of the circuit of the present invention with a function of reforming one system of a low speed PCM signal from a high speed PCM signal independently synchronized in the system (*b–d*). 201 is an input terminal for $S'_h$. 202 is an output terminal for $S_l$. 203 and 204 are input terminals for high speed channel timing pulses $h_{co}$ and $h_{ce}$, respectively. 205 and 206 are input terminals for resetting pulses $h_{do}$ and $h_{de}$, respectively. 207 is an input terminal for sampling pulse $h_\nu$. 208 is an input terminal for sampling pulses $l_t$. 209 and 210 are input terminals for low speed channel pulses $l_{co}$ and $l_{ce}$, respectively. 211 is an input terminal for low speed pilot pulses $l_p$. 212 is an input terminal for high speed sampling pulses $h_\nu$. 213, 214 and 215 are input terminals for high speed bit pulses $h_{c1}$, $h_{c2}$ and $h_{c3}$, respectively. 216 is an input terminal for detecting inputs $i$. 217 is an input terminal for low speed pilot pulses $l'_p$ delayed a little from the low speed pilot pulses $l_p$. A is an AND-gate. O is an OR-gate. $D_1$ and $D_2$ are delay line registers. $W_1$ and $W_2$ are pulse width converting circuits. M is a monostable multivibrator. P is a phase detector (for which the AND-gate is used). $p_1$ and $p_2$ are detected outputs. $\delta$ is a delay line. R is a shift register. $U_1$, $U_2$ . . . $U_5$ are its outputs. $\theta$ is a flip-flop. N is an inverting circuit. $\sigma_o$ and $\sigma_e$ are pulse outputs. 218 is an input terminal for a frame specifying pulse $f$. 219 is an input terminal for $p_1$.

Figure 9:
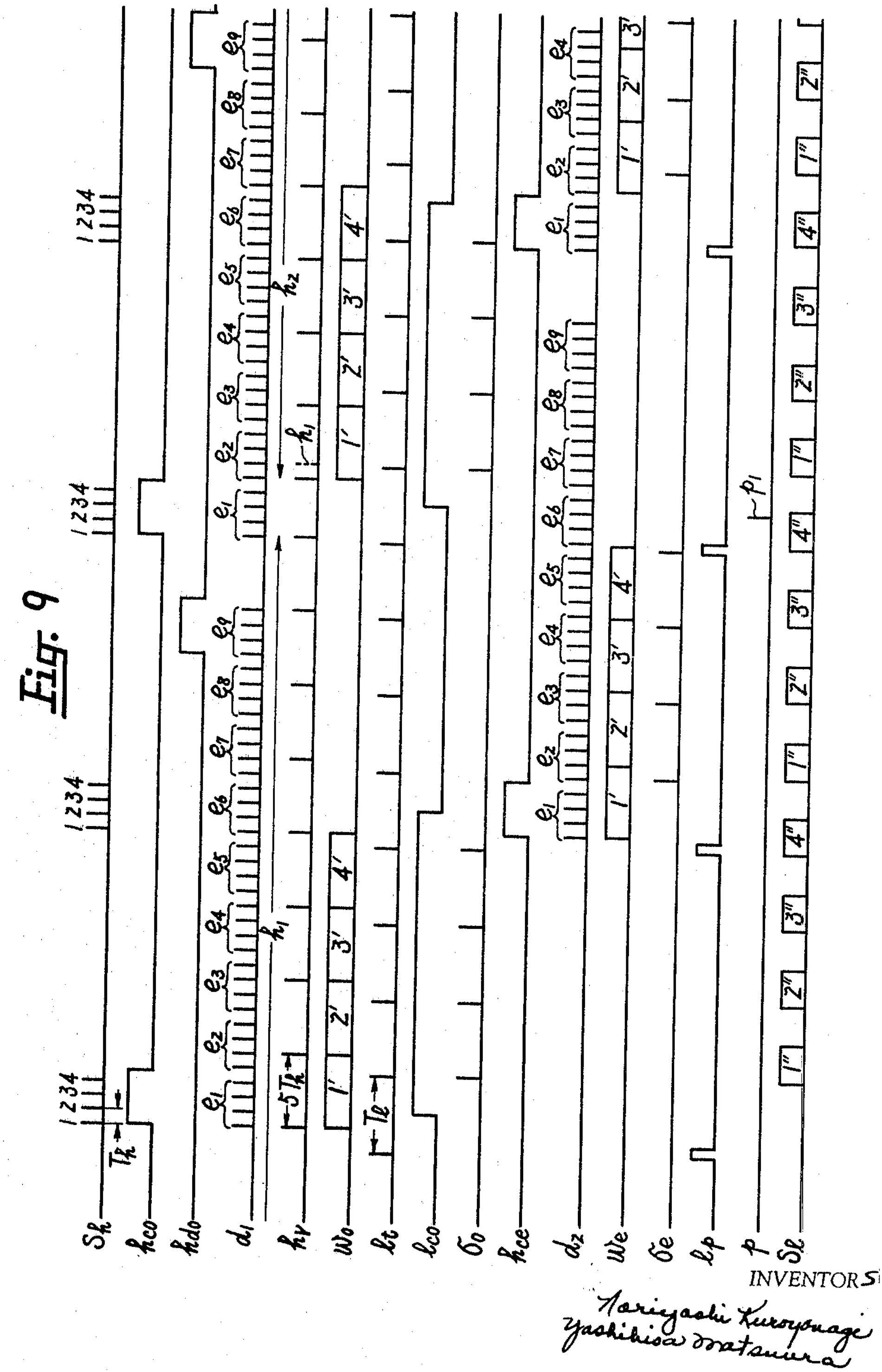
FIG. 9 is a supplementary explanatory diagram of FIG. 8.

FIG. 9 is a supplementary diagram of FIG. 8 for explaining the phase relation of respective pulse outputs. Here the high speed pulse signal is so narrow in pulse width that it may be indicated by a line. But, in fact, it should be considered that the position of the line is the leading edge of the pulse output wave form and that the line has a limited pulse width. Here, it is assumed that one channel signal consists of 4 bits and the flow of information is shown by giving numeral indications of 1, 2, 3 and 4. In the case of pulses having information, no pulse is delivered in response to a logical value of "0." But, in this diagram, in order to clearly show the time slots, indications of all the pulse outputs are given.

As explained in FIG. 1*a*, when a high speed PCM signal multiplexed with the independent synchronization system (*b–d*) is transmitted to the receiving side, it is separated into sub-high speed signals $S'_h$ for respective low speed systems with high speed framing pulses (not illustrated here) therein. A system for reforming the low speed PCM signal by removing the insertion pulse I out of the sub-high speed PCM signal $S_h$ shall be described. (Here the separation and reformation from the high speed PCM signal made of five low speed PCM systems is explained.)

In this case, first of all, a low speed sample pulse $l_t$ must be made from the sub-high speed PCM signal $S'_h$. If the number of insertion bits and the total number in time slots of the sub-high speed PCM pulse stream $S'_h$ in a long interval $T_k$ and $N_h$, respectively, the cycle time $T_1$ of the sample pulse $l_t$ will be obtained as $$T_1 = T_k/(N_h - N_i) \qquad (5)$$

It can be made by using a well known automatic phase controlled oscillator circuit.

The odd numbered channel signal in the sub-high speed PCM signal $S'_h$ is written into $D_1$ by the high speed channel timing pulse $h_{ce}$. The four bit information is once written in the delay line and becomes nine pulse trains $e_1$, $e_2$ . . . $e_9$ as shown on the $d_1$ step in FIG. 9. The delay time $T_\Delta$ in the delay line register is given by the Formula 3. In this case, too, generally, if the Formula 4 is satisfied between the number $n_b$ of the bits in the channel signal and the number $n_m$ of the systems of the multiplexed low speed PCM signal, such pulse trains as are shown on the $d_1$ line can be arranged. In case the Formula 4 is not satisfied, if the signals in one channel are divided (for example, into two) and are applied to separate delay line registers in turn, the same pulse trains can be arranged.

Each of the obtained pulse trains is formed of four pulse signals having information 1, 2, 3 and 4. The high speed sampling pulse $h_\nu$ has a cycle time of a high speed channel cycle time of $5T_h$. $\nu$ is a suffix for indicating the phase. At first, $h_\nu$ is set to be $h_\nu = h_1$.

As shown in FIG. 9, the first pulse signal of $e_1$, the second pulse signal of $e_2$, the third pulse signal of $e_3$ and, the fourth pulse signal of $e_4$ are read out with $h_1$ and transmitted to the converting circuit $W_1$. The output $w_o$ of the converting circuit $W_1$ has a pulse wave form of 100% duty factor, that is, an NRZ (non-return zero)

signal and the information it carries become 1′, 2′, 3′ and 4′ in response to 1, 2, 3 and 4 of $S_h$. The pulse train $e_5$ to $e_9$ is also to be read out with $h_1$ and become $w'_o$. However, their signals will not be utilized and therefore are not specifically indicated on the $w_o$ line in FIG. 9. $w_o$ is read out with the low speed sampling pulse $l_t$ and becomes a pulse output $\sigma_o$. As not only $w_o$ and $l_t$, but also low speed channel timing pulse $l_{co}$, are applied to the AND-gate A, the above described $w'_o$ vanishes here.

The even numbered channel signal of the sub-high speed PCM signals $S'_h$ becomes a low speed pulse output $\sigma_e$ through $D_2$ and $W_2$ in the same manner. $\sigma_o$ and $\sigma_e$ are combined together at the OR-gate O, applied to the monostable multivibrator, given a desired pulse width and become the original low speed PCM signal $S_1$.

Indications of 1, 2, 3 and 4 are given to the respective signals of $S_1$ in response to the informations 1, 2, 3 and 4 of the respective signals of $S'_h$.

There is the following relation between $T_1$ and $5T_h$:

$$T_1 > 5T_h \tag{6}$$

Therefore, with the lapse of time, the phase of $l_t$ will approach the boundary of the adjacent time slot of $w_o$. When it reaches the boundary, the normal reading function will become impossible and one information will be lost.

The fact that the boundary has been approached can be detected from the low speed pilot pulse $l_p$ and high speed sampling pulse $h_\nu$. The phase detecting circuit P is provided to prevent such information from vanishing. The output of P is slightly delayed and becomes a detected output $p_1$. $p_1$ is applied to the shift register R and shifts the state of R by one bit. As the outputs $u_1, u_2 \ldots u_5$ are applied respectively to five AND-gates, when all the outputs in $u_1, u_2 \ldots u_5$ are "1," $h_\nu = h_{o1}$, $h_\nu = h_{o2} \ldots h_\nu = h_{o5}$ and $h_\nu$ becomes respectively $h_1$, $h_2 \ldots h_5$. Therefore, when the high speed sampling pulse is $h_1$, if the detected output $p_1$ is generated, $h_1$ becomes $h_2$. $h_2$ is more advanced in phase by $T_h$ than the dotted line $h_1$ shown on the $h_\nu$ line in FIG. 9. The pulse train read out with $h_2$ is enclosed in the range from $e_2$ to $e_5$ as shown in FIG. 9 and $l_t$ can read out the output of $w_o$ without fail.

Thus, when the time elapses again, the detected output $p_1$ is generated and the phase of the high speed sampling pulse is shifted to $h_3$. When such process is repeated five times, the phase of the high speed sampling pulse becomes $h_5$ and the information is read out of the pulse trains $e_5$ to $e_9$. In this state, a special insertion pattern I with one channel length is transmitted as an insertion pulse in $S'_h$. The time for which the normal reforming function can be held in the state of $h_5$ is so long that it may be possible to transmit only one insertion pulse I during this period.

When the insertion pulse I is transmitted, a detected output $i$ with a wide pulse width can be obtained in a proper detecting circuit. $i$ generates a detected output $p_2$ synchronized with a pilot pulse $l''_p$ with a phase a little delayed from $l_p$, $p_2$ is applied to the resetting terminal of the shift register R and changes the phase of the high speed pilot pulse from $h_5$ to $h_1$.

On the other hand, a part of $i$ is applied also to the *not* input terminal of the AND-gate placed in front of the flip-flop O and only once changes the order of the low speed channel timing pulses $l_{co}$ and $l_{ce}$ which are generated alternately by $l_p$. The insertion pulse I vanishes in this process and is not transmitted to the output $S_1$.

By repeating such process, $S'_h$ can be converted to $S_1$.

FIG. 10 is a circuit diagram of another embodiment of the present invention having a function of reforming one system of a low speed PCM signal $S'_h$ from a high speed PCM signal independently synchronized in the system (*a–c*). 201 is an input terminal for detected outputs $p_1$. The other signs are the same as in FIGS. 2 and 4. FIG. 11 is a supplementary explanatory diagram of FIG. 10.

Here a system for reforming five systems of a low speed PCM signal from a multiplexed high speed PCM signal shall be explained. The cycle time of the high speed sampling pulse is selected to be $5T_h$. One channel signal consists of 4 bits. The high speed PCM signal $S_h$ separate previously to sub-high speed systems, and one of these systems is applied to one delay line register $D_1$ for each bit. When the phase of the high speed sampling pulse is $h_1$, the pulse signal applied to $D_1$ is readily read out. When the pilot pulse $l_p$ and $h_1$ are superimposed on each other with the lapse of time, a detected output $p_1$ is generated and, only at this time slot, the reading-out function by $h_1$ is stopped ($p_1$ is applied to the input terminal 201) and, at the same time, the phase change from $h_1$ to $h_2$ takes place. In such case, the pulse signal applied to $D_1$ is once reflected and is read out with $h_2$ in a phase delayed by $4T_h$. Therefore $e_2$ to $e_5$ among 5 pulse trains are utilized. Then, with further lapse of time, $p_1$ is generated again and the phase is changed from $h_2$ to $h_3$. At this time, the pulse trains $e_3$ to $e_6$ are utilized.

The high speed framing pulse F comes in when $h_\nu = h_\nu$ and $h_\nu = h_3$. It should be remembered that, in the latter case, the insertion pulse I comes also in following F. On the right side in FIG. 11*b*, there is shown a state of applying a frame specifying pulse $f$ in case $h_\nu = h_2$. The phase is changed from $h_2$ to $h_1$ by the pulse output $p_3$ delayed by about $1.5T_1$ from $f$ and the time slots of the low speed PCM signals correpsonding to F and I vanish.

The output read out with $h_\nu$ becomes an NRZ signal $w$, is read out with a low speed sampling pulse $l_t$, its pulse width is expanded and a desired original low speed PCM signal $S_1$, is regenerated. Thus, the reforming function of the system (*a–c*) can be accomplished.

FIG. 12 shows an example of the delay line registers $D_1$, $D_2$ and $D_3$ in the partial circuits used in FIGS. 2, 4 and 6. $t$ is a tunnel diode. 234 is an ordinary diode. $r_1$, $r_2$ and $r_3$ are resistances. $s$ is a switch. 230 is an input terminal. 233 is a coaxial cable (or delay line). $h_d$ is a drive input which is a high speed clock pulse of a cycle time of $T_h$. When the drive input $h_d$ is not applied, no current flows to the tunnel diode $t$ and the diode is not triggered. But, when $h_d$ is applied and an input of a larger amplitude than a threshold level from the input terminal 230, the tunnel diode $t$ is triggered and a positive pulse output with equal pulse width to the drive input is obtained. This output is transmitted to the coaxial cable 233. As the switch $s$ is normally open, by the open termiation reflection, the positive input is again applied to the tunnel diode $t$ through the the resistance $r_2$. In such case, if the delay time $\gamma_2$ of the coaxial cable 233 is selected to be an integral number of times as long as $T_h/2$ so that just the drive input $h_d$ may be applied, the tunnel diode is again triggered. If $\tau_2$ is selected to be $\tau_2 = 2T_h$, as explained in FIG. 3, reflected outputs are obtained in turn with a phase delayed by $4T_h$.

In order to once erase the contents memorized in this delay line register, if the switch $s$ is closed and the coaxial cable 233 is matching terminated, no reflected signal is generated and then the tunnel diode $t$ can not be triggered. The input applied to the resetting terminal of each of $D_1$ and $D_2$ serve to close the switch $s$. The switch $s$ can be easily realized by using a transistor.

FIG. 13 shows another embodiment of the shift register R which is a partial circuit used in FIGS. 2, 4, 6 and 8 and its peripheral circuit. In this embodiment, the phase change of the high speed sampling pulse $h_\nu$ can be realized with a simple circuit formation in which are used delay line registers and logical gates. 250 is an input terminal for setting pulses. 251 is an input terminal for resetting pulses. (The input terminals 250 and 251 correspond to the two input terminals of the shift register R.) 252 is an input terminal for high speed bit pulses $h_{o1}$ (of the same pulse wave form as of $h_1$). 253 is an output terminal in which high speed sampling pulses $h_\nu$ are obtained. $\delta$ is a delay line, the delay time being shown in the parentheses. The other signs are the same as in FIG. 2. First of all, a resetting pulse $r$ ($h_\nu$) (a pulse signal having a phase synchronized with the high speed sampling pulse $h_\nu$ now generated) is applied to the input terminal 251.

The resetting pulse $r$ ($h_\nu$) has its pulse width expanded to about $4T_h$ by the monostable multivibrator M. The output of the monostable multivibrator M must always be superimposed on the pulse of one of the bit pulses $h_{0l}$. The one superimposed pulse among $h_{0l}$ is applied to $D_1$ through the AND-gate A and OR-gate O. As a high speed clock pulse for the drive pulse is applied to $D_1$, if the delay time of the stored delay line is selected to be $2.5T_h$, a high speed sampling pulse $h_1$ having a cycle time of $5T_h$ and a phase of $h_{0l}$ is generated. Further, as the resetting pulse $r$ ($h_\nu$) is applied to the resetting terminal of $D_1$ through $\delta$ ($2.5T_h$), the high speed sampling pulse $h_\nu$ previously generated then vanishes. Then, if a setting pulse $s$ ($h_\nu$) ($s$ ($h_1$) in the case) is applied to the input terminal 250, $h_1$ vanishes through the delay line $\delta$ ($2.5T_h$). On the other hand, a pulse input delay by $4T_h$ from $h_1$ through the delay line $\delta$ ($4T_h$) is applied to $D_1$ through the OR-gate Therefore, in $D_1$, a high speed sampling pulse $h_2$ with both a phase delayed by $4T_h$ from $h_1$ and a cycle time of $5T_h$ is generated. Then, if a setting pulse $s$ ($h_1$) is applied to the input terminal 250, the phase of the high speed sampling pulse can be changed from $h_2$ to $h_3$ by the same principle The AND-gate connected to the delay lines $\delta$ ($2.5T_h$) and $\delta$ ($4T_h$) are used so that though the setting pulse and resetting pulse are not perfectly synchronized with the high speed sampling pulse $h_\nu$ being generated, they may be made synchronized pulses when they have such pulse widths as include $h_\nu$. By using such a circuit, it is possible to generate phase-variable high speed sampling pulses necessary for the present invention.

When the principle of the present invention is applied, a low speed PCM signal will be able to be separated and reformed from a high speed PCM signal which is composed of several low speed signals by using arbitrary bit multiplexing and inserting independent synchronization.

According to the system of the present invention, as the delay line register operates the same as a plurality of memory elements, the circuit formation can be made much simpler than in an elastic memory system in which for example, one tunnel diode is used as a memory element for each bit.

As explained in detail in the above, according to the present invention, there can be realized a speed multiplexing system for converting low speed PCM signals of $n$ systems into a high speed PCM signal or separating and reforming any desired low speed PCM signal from the high speed PCM signal with a simple circuit formation without using many registers. Therefore, the present invention used for a terminal equipment of a broadband PCM system will achieve excellent results.

What is claimed is:

1. Apparatus for pulse speed conversion in a PCM transmission system, comprising; means for generating a plurality of pulse groups each pulse group containing the information of an associated PCM input signal, said generating means each including a delay line register for converting each of said PCM signals to a sub-high speed PCM signal, means for reading out only a single one of said pulse groups having a predetermined phase, means for sampling said input PCM signals by a sampling pulse which is synchronous with said converted PCM signals and controlled in response to a predetermined phase difference between said sub-high speed PCM signals and the speed of said input PCM signals, and means for inserting additional pulses into said sub-high speed PCM signals or for dropping pulses from said sub-high speed PCM signals at every instant when said phase difference exceeds a predetermined threshold level whereby said phase difference can be compensated.

References Cited

UNITED STATES PATENTS

| | | | |
|---|---|---|---|
| 3,288,928 | 11/1966 | Bartlett | 178—50 |
| 3,353,158 | 11/1967 | Davis | 179—15 |
| 3,042,751 | 7/1962 | Graham | 179—15 |
| 3,387,086 | 6/1968 | Beresin | 178—50 |
| 3,420,956 | 1/1969 | Heightley et al. | 179—15 |

ROBERT L. GRIFFIN, Primary Examiner

C. R. VONHELLENS, Assistant Examiner

U.S. Cl. X.R.

178—50